United States Patent
Aoshima et al.

(10) Patent No.: US 11,046,791 B2
(45) Date of Patent: Jun. 29, 2021

(54) METHOD FOR PRODUCING MODIFIED CONJUGATED DIENE POLYMER AND METHOD FOR PRODUCING POLYMER COMPOSITION

(71) Applicant: SUMITOMO CHEMICAL COMPANY, LIMITED, Tokyo (JP)

(72) Inventors: Hiroshi Aoshima, Ichihara (JP); Masako Imai, Ichihara (JP); Katsunari Inagaki, Tokyo (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 100 days.

(21) Appl. No.: 16/322,562

(22) PCT Filed: Aug. 4, 2017

(86) PCT No.: PCT/JP2017/028416
§ 371 (c)(1),
(2) Date: Feb. 1, 2019

(87) PCT Pub. No.: WO2018/025998
PCT Pub. Date: Feb. 8, 2018

(65) Prior Publication Data
US 2020/0216578 A1 Jul. 9, 2020

(30) Foreign Application Priority Data

Aug. 5, 2016 (JP) .............................. JP2016-154894
Aug. 18, 2016 (JP) .............................. JP2016-160838
Mar. 31, 2017 (JP) .............................. JP2017-070428

(51) Int. Cl.
| | |
|---|---|
| *C08C 19/22* | (2006.01) |
| *C08C 19/25* | (2006.01) |
| *C08C 19/44* | (2006.01) |
| *C08K 3/36* | (2006.01) |
| *C08L 15/00* | (2006.01) |
| *C08C 19/26* | (2006.01) |

(52) U.S. Cl.
CPC .............. *C08C 19/26* (2013.01); *C08C 19/25* (2013.01); *C08K 3/36* (2013.01)

(58) Field of Classification Search
CPC ......... C08C 19/00; C08C 19/30; C08C 19/42; C08C 19/44; C08C 19/22; C08C 19/24; C08C 19/25; C08C 19/26; C08F 236/14; C08F 8/42; C08K 3/36; C08L 15/00; C08L 47/00
See application file for complete search history.

(56) References Cited

U.S. PATENT DOCUMENTS

| | | | | |
|---|---|---|---|---|
| 3,655,598 | A | * | 4/1972 | Antonen ................. C08L 83/04 528/15 |
| 4,616,069 | A | * | 10/1986 | Watanabe ............... C08C 19/44 525/332.9 |
| 4,957,976 | A | | 9/1990 | Takao et al. |
| 2004/0254301 | A1 | | 12/2004 | Tsukimawashi et al. |
| 2005/0203251 | A1 | | 9/2005 | Oshima et al. |
| 2010/0056711 | A1 | | 3/2010 | Fujii et al. |
| 2010/0056713 | A1 | | 3/2010 | Oshima |
| 2010/0113683 | A1 | | 5/2010 | Matsumoto et al. |
| 2010/0152369 | A1 | | 6/2010 | Shibata et al. |
| 2012/0252966 | A1 | | 10/2012 | Ito |
| 2013/0296480 | A1 | * | 11/2013 | Hogan .................... C08L 15/00 524/575 |
| 2015/0361210 | A1 | | 12/2015 | Nosaka et al. |
| 2017/0267800 | A1 | | 9/2017 | Tajima |
| 2017/0369599 | A1 | | 12/2017 | Tajima |

FOREIGN PATENT DOCUMENTS

| | | |
|---|---|---|
| CN | 101659730 A | 3/2010 |
| CN | 101668780 A | 3/2010 |
| JP | 63-186748 A | 8/1988 |
| JP | 2001-139633 A | 5/2001 |
| JP | 2004-51757 A | 2/2004 |
| JP | 2005-290355 A | 10/2005 |
| JP | 2008-260943 A | 10/2008 |
| JP | 2010-077412 A | 4/2010 |
| JP | 201174310 A * | 4/2011 |
| JP | 2012-214711 A | 11/2012 |
| WO | 2008/123163 A1 | 10/2008 |
| WO | 2008/123164 A1 | 10/2008 |
| WO | WO-2009148932 A1 * | 12/2009 |
| WO | 2014/133097 A1 | 9/2014 |
| WO | 2016/039381 A1 | 3/2016 |

(Continued)

OTHER PUBLICATIONS

Invitation to Respond to Written Opinion dated Mar. 31, 2020, from the Intellectual Property Office of Singapore in SG Application No. 11201900908W.
"Database WPI, Week 201378", Thomson Scientific, London, GB; AN 2013-U43443, 2013, XP002797271 (total 2 pages).
Communication dated Feb. 14, 2020 from European Patent Office in EP Application No. 17837099.5.
International Search Report dated Oct. 31, 2017 issued in PCT/JP2017/028416.
International Preliminary Report on Patentability with the translation of Written Opinion dated Feb. 14, 2019 issued in PCT/JP2017/028416.

(Continued)

*Primary Examiner* — Irina S Zemel
*Assistant Examiner* — Jeffrey S Lenihan
(74) *Attorney, Agent, or Firm* — Sughrue Mion, PLLC

(57) ABSTRACT

The invention relates to a method for producing a modified conjugated diene-based polymer, comprising a step of reacting an organometallic compound with a unit based on a modifying agent, in a conjugated diene-based polymer that has a unit based on a conjugated diene compound-containing monomer and a unit based on a modifying agent having a silicon atom, tin atom, germanium atom or phosphorus atom.

7 Claims, No Drawings

(56) References Cited

FOREIGN PATENT DOCUMENTS

WO        2016/104628 A1     6/2016
WO   WO-2017067877 A1 *  4/2017

OTHER PUBLICATIONS

First Office Action dated Jul. 13, 2020 from the China National Intellectual Property Administration in counterpart Application No. 201780047567.6.
Second Office Action dated Mar. 8, 2021, from the China National Intellectual Property Administration in Application No. 201780047567.6.
Office Action dated Feb. 10, 2021 by the Intellectual Property Office on Singapore in application No. 11201900908W.

* cited by examiner

METHOD FOR PRODUCING MODIFIED CONJUGATED DIENE POLYMER AND METHOD FOR PRODUCING POLYMER COMPOSITION

CROSS REFERENCE TO RELATED APPLICATIONS

This application is a National Stage of International Application No. PCT/JP2017/028416 filed Aug. 4, 2017, claiming priority based on Japanese Patent Application No. 2016-154894 filed Aug. 5, 2016, Japanese Patent Application No. 2016-160838 filed Aug. 18, 2016, and Japanese Patent Application No. 2017-070428 filed Mar. 31, 2017.

TECHNICAL FIELD

The present invention relates to a method for producing a modified conjugated diene-based polymer, and to a method for producing a polymer composition containing the polymer.

BACKGROUND ART

Increasing concern regarding environmental issues in recent years has led to greater demand for increased fuel efficiency for vehicles, as well as improved fuel efficiency for the polymer compositions used in vehicle tires. Polymer compositions that are used for vehicle tires include polymer compositions containing conjugated diene-based polymers such as polybutadiene and butadiene-styrene copolymer and fillers such as carbon black and silica. Polymer compositions with satisfactory fuel efficiency have been proposed, such as polymer compositions containing polymers that are conjugated diene-based polymers obtained by polymerization of butadiene or copolymerization of butadiene and styrene with an alkyllithium as the polymerization initiator, being modified with alkoxysilanes having dialkylamino groups (see PTLs 1 and 2).

CITATION LIST

Patent Literature

[PTL 1] JP S63-186748 A
[PTL 2] JP 2005-290355 A

SUMMARY OF INVENTION

Technical Problem

Such polymer compositions with satisfactory fuel efficiency have tended to exhibit increased viscosity with time. Polymer compositions that employ conjugated diene-based polymers are therefore desired to have storage stability as well as satisfactory fuel efficiency. In light of these circumstances, the problem to be solved by the invention is that of providing a method for producing a modified conjugated diene-based polymer that can yield a polymer composition having satisfactory fuel efficiency performance, and also excellent storage stability.

Solution to Problem

The invention relates to a method for producing a modified conjugated diene-based polymer, comprising a step of allowing an organometallic compound to act on a conjugated diene-based polymer with a unit based on a conjugated diene compound-containing monomer, and a unit based on a modifying agent that has a silicon atom, tin atom, germanium atom or phosphorus atom.

The invention further relates to a method for producing a polymer composition, comprising a step of kneading 10 to 150 parts by mass of a reinforcing material with respect to 100 parts by mass of the modified conjugated diene-based copolymer produced by the aforementioned method.

Advantageous Effects of Invention

With the present invention it is possible to provide a method for producing a modified conjugated diene-based polymer that can yield a polymer composition having satisfactory fuel efficiency performance, and also excellent storage stability.

DESCRIPTION OF EMBODIMENTS

Embodiments of the invention will now be described in detail. However, the invention is not limited to the embodiments described below.

Throughout the present specification, "hydrocarbyl group" refers to a monovalent group resulting from removal of one hydrogen from a hydrocarbon. The term "hydrocarbylene group" refers to a divalent group resulting from removal of two hydrogen atoms from a hydrocarbon. The term "hydrocarbyloxy group" refers to a monovalent group having a structure in which the hydrogen of a hydroxy group is replaced by a hydrocarbyl group. The phrase "amino group with a substituent" (hereunder also referred to as "substituted amino group") refers to a group having a structure in which at least one hydrogen of an amino group is replaced by a monovalent atom other than hydrogen, or a monovalent group, or a group having a structure in which the two hydrogen atoms of an amino group are replaced by a divalent group. The phrase "hydrocarbyl group with a substituent" (hereunder also referred to as "substituted hydrocarbyl group") means a monovalent group having a structure in which at least one hydrogen of a hydrocarbyl group is replaced by a substituent. The phrase "hydrocarbylene group with a nitrogen atom and/or oxygen atom" refers to a divalent group having a structure in which a carbon atom of the hydrocarbylene group other than a carbon atom from which a hydrogen has been removed, and/or hydrogen, is replaced by a group with a nitrogen atom and/or oxygen atom.

[Method for Producing Modified Conjugated Diene-Based Polymer]

The method for producing a modified conjugated diene-based polymer of this embodiment comprises a step of allowing an organometallic compound to act on a conjugated diene-based polymer with a unit based on a conjugated diene compound-containing monomer, and a unit based on a modifying agent that has a silicon atom, tin atom, germanium atom or phosphorus atom. The step may be reaction of an organometallic compound with a unit based on the aforementioned modifying agent for the conjugated diene-based polymer.

The conjugated diene-based polymer this embodiment may have a unit based on the modifying agent at the ends of the polymer, or it may have a unit based on the modifying agent within the molecular chain of the polymer, or it may have a unit based on the modifying agent both at the ends and within the molecular chain of the polymer. When a modifying agent has numerous functional groups, usually the fuel efficiency tends to be superior and the storage stability tends to be inferior.

When a unit based on the modifying agent is at the ends of the polymer, the modified conjugated diene-based polymer of this embodiment may be produced by the following method.

First, as step 1, a monomer including a conjugated diene compound is polymerized in the presence of a polymerization initiator, to obtain a polymer having active ends. Next, as step 2, the modifying agent having a functional group that can react with the active ends of the polymer is reacted with the polymer, to introduce a unit based on the modifying agent at the ends of the polymer. In this step, polymers which are at least dimers, having two or more polymers linked via the modifying agent, may also be produced and copresent. As step 3, an organometallic compound is added to the polymer having a unit based on the modifying agent, reacting the organometallic compound with the unit based on the modifying agent, to obtain a modified conjugated diene-based polymer for this embodiment.

When the unit based on the modifying agent is to be introduced into the molecular chain of the polymer, the modifying agent used may be one having a functional group that is copolymerizable with the conjugated diene compound. For example, as step F, when the monomer including a conjugated diene compound is to be polymerized in the presence of the polymerization initiator, the modifying agent having the functional group that is copolymerizable with the conjugated diene compound is polymerized together with it, to obtain a polymer having the unit based on the modifying agent, within the molecular chain of the polymer. As a subsequent step 3', an organometallic compound is added to the polymer having a unit based on the modifying agent, reacting the organometallic compound with the unit based on the modifying agent, to obtain a modified conjugated diene-based polymer for this embodiment. In this case, as step 2', a modifying agent having a functional group that can react with the active ends of the polymer, may be reacted with the polymer obtained in step to introduce the unit based on the modifying agent at the ends of the polymer, thereby obtaining a conjugated diene-based polymer having the unit based on the modifying agent at the ends and within the molecular chain of the polymer, after which step 3' may be carried out to obtain the corresponding modified conjugated diene-based polymer.

When the unit based on the modifying agent is to be introduced into the molecular chain of the polymer, the compound used may be a conjugated diene compound and/or aromatic vinyl compound that is copolymerizable with the conjugated diene compound, and that has a functional group that can be converted to a site capable of reacting with the modifying agent. For example, as step 1", when a monomer including a conjugated diene compound is to be polymerized in the presence of a polymerization initiator, it may be polymerized together with a compound which is a conjugated diene compound and/or aromatic vinyl compound that is copolymerizable with the conjugated diene compound, and that has a functional group that can be converted to a site capable of reacting with the modifying agent (for example, 4-methylstyrene) to obtain a polymer, and then the functional group may be converted to the site capable of reacting with the modifying agent (for example, allowing an organometallic compound to act on a polymer having a unit based on 4-methylstyrene, to remove the hydrogen atoms from the methyl group), and reacting it with the modifying agent having a functional group capable of reacting with the converted functional group, to obtain a polymer having a unit based on the modifying agent within the molecular chain of the polymer. As a subsequent step 3", an organometallic compound is added to the polymer having a unit based on the modifying agent, reacting the organometallic compound with the unit based on the modifying agent, to obtain a modified conjugated diene-based polymer for this embodiment. In this case, as step 2", a modifying agent having a functional group that can react with the active ends of the polymer, may be reacted with the polymer obtained in step 1", to introduce the unit based on the modifying agent at the ends of the polymer, thereby obtaining a conjugated diene-based polymer having the unit based on the modifying agent at the ends and within the molecular chain of the polymer, after which step 3" may be carried out to obtain the corresponding modified conjugated diene-based polymer.

The components that may be used to produce the modified conjugated diene-based polymer of this embodiment will now be described.

(Monomers)

Examples of conjugated diene compounds include 1,3-butadiene, isoprene, 1,3-pentadiene, 2,3-dimethyl-1,3-butadiene and 1,3-hexadiene, with 1,3-butadiene or isoprene being preferred.

The monomers for this embodiment may include aromatic vinyl compounds with the conjugated diene compound. Examples of aromatic vinyl compounds include styrene, α-methylstyrene, vinyltoluene, vinylnaphthalene, divinylbenzene, trivinylbenzene and divinylnaphthalene, with styrene being preferred.

The aromatic vinyl compound content of the monomers is preferably 5 mass % or greater and more preferably 14 mass % or greater, with 100 mass % as the total amount of the monomers. The aromatic vinyl compound content is preferably no greater than 50 mass % and more preferably no greater than 45 mass %, for increased fuel efficiency.

(Vinylating Agent)

The conjugated diene-based polymer may be produced in the presence of an agent that adjusts the number of vinyl bonds in the monomer unit from the conjugated diene compound, or an agent that adjusts the distribution of monomer units from the conjugated diene compound, monomer units from the aromatic vinyl compound and monomer units from the other compounds, in the conjugated diene-based polymer chain (such agents will be referred to collectively as "adjusting agent").

Examples of adjusting agents include ether compounds, tertiary amines, phosphine compounds, alkali metal alkoxides and alkali metal phenoxides. Examples of ether compounds include cyclic ethers such as tetrahydrofuran, tetrahydropyran and 1,4-dioxane; aliphatic monoethers such as diethyl ether and dibutyl ether; aliphatic diethers such as ethyleneglycol dimethyl ether, ethyleneglycol diethyl ether and ethyleneglycol dibutyl ether; aliphatic triethers such as diethyleneglycol diethyl ether and diethyleneglycol dibutyl ether; and aromatic ethers such as diphenyl ether, anisole, 1,2-dimethoxybenzene and 3,4-dimethoxytoluene. Examples of tertiary amines include triethylamine, tripropylamine, tributylamine, 1,1,2,2-tetramethylethylenediamine, N,N-diethylaniline, pyridine and quinoline. Examples of phosphine compounds include trimethyl phosphine, triethyl phosphine and triphenylphosphine. Examples of alkali metal alkoxides include sodium-Cert-butoxide, potassium-tert-butoxide, sodium-tert-pentoxide and potassium-tert-pentoxide. Examples of alkali metal phenoxides include sodium phenoxide and potassium phenoxide. Two or more different types of these may also be used in combination.

(Polymerization Initiator)

The polymerization initiator may be an alkali metal, a complex of an alkali metal and a polar compound, an oligomer with an alkali metal, an organic alkali metal compound, a Ziegler-Natta catalyst, a metallocene catalyst or a conjugated diene-based polymer with active ends. Organic alkali metal compounds are preferred as polymerization initiators. Two or more of such polymerization initiators may also be used in combination.

Examples of alkali metals include lithium, sodium, potassium, rubidium and cesium. Examples of complexes of alkali metals and polar compounds include potassium-tetrahydrofuran complex and potassium-diethoxyethane complex. Examples of oligomers with alkali metals include sodium salt of α-methylstyrene tetramer. Examples of organic alkali metal compounds include organic alkali metal compounds with nitrogen atom-containing groups and organic alkali metal compounds with hydrocarbyl groups.

Examples of organic alkali metal compounds with hydrocarbyl groups include ethyllithium, n-propyllithium, isopropyllithitm, n-butyllithium, sec-butyllithium, tert-octyllithium, n-decyllithium, phenyllithium, 2-naphthyllithium, 2-butylphenyllithium, 4-phenylbutyllithium, cyclohexyllithium, cyclopentyllithium, 1,4-dilithiobutane, 1,4-dilithio-2-butene, 1,3,5-trilithiobenzene, 1,3,5-tris(lithiomethyl)benzene, 2,3,5-tris(lithiornethypriaphthalene, 1,4,5-tris(lithiomethyl)naphthalene, sodium naphthalenide, sodium biphenylide and potassium naphthalenide, with n-butyllithium being preferred.

An organic alkali metal compound with a nitrogen atom-containing group is preferably an organic alkali metal compound having a group represented by the following formula (2).

[Chemical Formula 1]

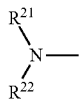

(2)

In formula (2), $R^{21}$ and $R^{22}$ each independently represent an optionally substituted hydrocarbyl group or trihydrocarbylsilyl group, or they may form a hydrocarbylene group by bonding of a portion of $R^{21}$ to a portion of $R^{22}$, and optionally having a nitrogen atom and/or oxygen atom, or a group of 5 to 20 carbon atoms represented by —Si($R^{32}$)$_2$—(CH$_2$)$_x$—Si($R^{32}$)$_2$— (where $R^{32}$ represents a hydrocarbyl group and x is an integer of 1 to 10), or a group of 4 to 20 carbon atoms represented by Si($R^{32}$)$_2$—(CH$_2$)$_y$— (where $R^{33}$ represents a hydrocarbyl group and y is an integer of 2 to 11).

Examples of hydrocarbyl groups for $R^{21}$ and $R^{22}$ include alkyl, alkenyl, alkynyl, aryl and aralkyl groups. Examples of alkyl groups include methyl, ethyl, n-propyl, isopropyl, n-butyl, sec-butyl, tert-butyl, n-pentyl, n-hexyl, n-octyl, n-dodecyl, cyclopentyl and cyclohexyl groups. Examples of alkenyl groups include vinyl, allyl, 1-propenyl and isopropenyl groups. Examples of alkynyl groups include ethynyl and 2-propynyl groups. Examples of aryl groups include phenyl, methylphenyl, ethylphenyl, benzyl, tolyl and xylyl groups. Examples of aralkyl groups include benzyl groups.

The hydrocarbyl groups are preferably alkyl groups, and more preferably alkyl groups of 1 to 4 carbon atoms.

Examples of hydrocarbyl groups with a substituent, for $R^{21}$ and $R^{22}$, include hydrocarbyl groups with one or more hydrogen atoms replaced by a substituted amino group, hydrocarbyl groups with one or more hydrogen atoms replaced by a hydrocarbyloxy group, hydrocarbyl groups with one or more hydrogen atoms replaced by a trialkylsilyl group, and hydrocarbyl groups with one or more hydrogen atoms replaced by a trialkoxysilyl group.

Examples of substituted amino groups include N,N-dialkylamino groups such as N,N-dimethylamino and N,N-diethylamino groups, and cycloamino groups such as 1-pyrrolyl, 1-piperidyl and 1-imidazolyl groups.

Examples of hydrocarbyl groups with one or more hydrogen atoms replaced by a substituted amino group include (N,N-dialkylamino)alkyl groups such as N,N-dimethylaminomethyl, 2-(N,N-dimethylamino)ethyl, 2-(N,N-diethylamino)ethyl, 3-(N,N-dimethylamino)propyl and 3-(N,N-diethylamino)propyl groups; (N,N-dialkylamino)aryl groups such as 4-(N,N-dimethylamino)phenyl, 3-(N,N-dimethylamino)phenyl, 4-(N,N-diethylamino)phenyl and 3-(N,N-diethylamino)phenyl groups; (N,N-dialkylamino)alkylaryl groups such as 4-(N,N-dimethylamino)methylphenyl and 4-[2-(N,N-dimethylamino)ethyl]phenyl groups; cycloamino group-substituted alkyl groups such as 3-(1-pyrrolidinyl)propyl, 3-(1-piperidinyl)propyl and 3-(1-imidazolyl)propyl groups; cycloamino group-substituted aryl groups such as 4-(1-pyrrolidinyl)phenyl, 4-(1-piperidinyl)phenyl and 4-(1-imidazolyl)phenyl groups; and cycloamino group-substituted alkylaryl groups such as 4-[2-(1-pyrrolidinyl)ethyl]phenyl, 4-[2-(1-piperidinyl)ethyl]phenyl and 4-[2-(1-imidazolyl)ethyl]phenyl groups.

Examples of hydrocarbyl groups with one or more hydrogen atoms replaced by hydrocarbyloxy groups include alkoxyalkyl groups such as methoxymethyl, ethoxymethyl, methoxyethyl and ethoxyethyl groups.

Examples of hydrocarbyl groups with one or more hydrogen atoms replaced by trialkylsilyl groups include trialkylsilylalkyl groups such as trimethylsilylmethyl, 2-trimethylsilylethyl and 3-trimethylsilylpropyl groups.

Examples of hydrocarbyl groups with one or more hydrogen atoms replaced by trialkoxysilyl groups include trialkoxysilylalkyl groups such as trimethoxysilylmethyl, 2-trimethoxysilylethyl and 3-trimethoxysilylpropyl groups.

An optionally substituted hydrocarbyl group is preferably an optionally substituted hydrocarbyl group of 1 to 20 carbon atoms, more preferably a hydrocarbyl group of 1 to 20 carbon atoms, even more preferably an alkyl group of 1 to 10 carbon atoms, yet more preferably a methyl, ethyl, n-propyl, isopropyl, n-butyl, isobutyl, sec-butyl or tert-butyl group, and most preferably a methyl or ethyl group.

Examples of trihydrocarbylsilyl groups for $R^{21}$ and $R^{22}$ include trialkylsilyl groups such as trimethylsilyl, triethylsilyl, tripropylsilyl, triisopropylsilyl, tributylsilyl, tripentylsilyl, trihexylsilyl and tert-butyl-dimethylsilyl groups, with trimethylsilyl and triethylsilyl groups being preferred.

A "hydrocarbylene group optionally having a nitrogen atom and/or oxygen atom, formed by bonding of a portion of $R^{21}$ with a portion of $R^{22}$" is a hydrocarbylene group, or a hydrocarbylene group with a nitrogen atom and/or oxygen atom.

Examples of hydrocarbylene groups include groups formed by bonding of an alkylene, alkenediyl, arylene or arylene group with an alkylene group (hereunder also referred to as "arylene-alkylene group"). Examples of alkylene groups include methylene, ethylene, propylene, tetramethylene, pentamethylene, hexamethylene, heptamethylene, octamethylene and 2,2,4-trimethylhexane-1,6-diyl groups. Examples of alkenediyl groups include pentane-2-ene-1,5-diyl groups. Examples of arylene groups include phenylene, naphthylene and biphenylene groups. Examples of arylene-alkylene groups include phenylene-alkylene, naphthylene-alkylene and biphenylene-alkylene groups. The hydrocarbylene group is preferably an alkylene group, and more preferably an alkylene group of 4 to 7 carbon atoms.

Examples of hydrocarbylene groups with a nitrogen atom and/or oxygen atom include groups represented by —CH=N—CH=CH—, groups represented by —CH—N—CH$_2$—CH$_2$— and groups represented by —CH$_2$—CH$_2$—O—CH$_2$—CH$_2$—, with groups represented by —CH=N—CH$_2$—CH$_2$— or —CH$_2$—CH$_2$—O—CH$_2$—CH$_2$— being preferred.

A hydrocarbylene group optionally having a nitrogen atom and/or oxygen atom is preferably a hydrocarbylene group of 3 to 20 carbon atoms optionally having a nitrogen atom and/or oxygen atom, preferably a hydrocarbylene group of 3 to 20 carbon atoms, more preferably an alkylene group of 4 to 7 carbon atoms, and even more preferably a tetramethylene, pentamethylene or hexamethylene group.

Examples of groups of 5 to 20 carbon atoms represented by —Si(R$^{35}$)$_2$—(CH$_2$)$_x$—Si(R$^{35}$)$_2$—, formed by bonding of a portion of R$^{21}$ with a portion of R$^{22}$ (where R$^{35}$ represents a hydrocarbyl group and x is an integer of 1 to 10) include the group represented by —Si(CH$_3$)$_2$—CH$_2$—CH$_2$—Si(CH$_3$)$_2$.

Examples of groups of 4 to 20 carbon atoms represented by —Si(R$^{36}$)$_2$—(CH$_2$)$_y$—, formed by bonding of a portion of R$^{21}$ with a portion of R$^{22}$ (where R$^{36}$ represents a hydrocarbyl group and y is an integer of 2 to 11) include the group represented by —Si(CH$_3$)$_2$—CH$_2$—CH$_2$—CH$_2$—.

Preferably, R$^{21}$ and R$^{22}$ each independently represent a hydrocarbyl group, or represent a hydrocarbylene group in which a portion of R$^{21}$ is bonded with a portion of R$^{22}$, more preferably they each independently represent an alkyl group of 1 to 4 carbon atoms or alkylene group of 4 to 7 carbon atoms in which a portion of R$^{21}$ is bonded with a portion of R$^{22}$, even more preferably they each independently represent an alkyl group of 1 to 4 carbon atoms, and yet more preferably they each independently represent a methyl or ethyl group.

Specific examples of organic alkali metal compounds having groups represented by formula (2) include dimethylaminopropyllithium, diethylaminopropyllithium, tert-butyldimethylsilyloxypropyllithium, N-morpholinopropyllithium, lithium hexamethyleneimide, lithium pyrrolidide, lithium piperidide, lithium heptamethyleneimide and lithium dodecamethyleneimide.

The method for producing an organic alkali metal compound having a group represented by formula (2) may be a method using a compound represented by formula (3), or a method of reacting an organic alkali metal compound with a secondary amine compound having a group represented by formula (2).

[Chemical Formula 2]

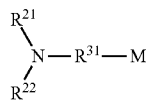

(3)

In formula (3), R$^{21}$ and R$^{22}$ have the same respective definitions as R$^{21}$ and R$^{22}$ in formula (2), R$^{31}$ represents a hydrocarbylene group of 6 to 100 carbon atoms, and M represents an alkali metal atom.

A hydrocarbylene group of 6 to 100 carbon atoms for R$^{31}$ is preferably a hydrocarbylene group of 7 to 90 carbon atoms, and more preferably a hydrocarbylene group of 8 to 80 carbon atoms.

A hydrocarbylene group of 8 to 80 carbon atoms for R$^{31}$ is preferably a group represented by formula (3-1).

[Chemical Formula 3]

(3-1)

In formula (3-1), R$^{34}$ represents a structural unit derived from a conjugated diene compound and/or a structural unit derived from an aromatic vinyl compound, and i and f are integers of 1 to 10. The —(CH$_2$)$_i$ group in formula (3-1) bonds with the nitrogen atom of formula (3), and R$^{34}$ bonds with the M of formula (3).

The structural unit from a conjugated diene compound and/or the structural unit from an aromatic vinyl compound in R$^{34}$ is preferably an isoprene-derived structural unit, a styrene-derived structural unit or a butadiene-derived structural unit.

The letter f is preferably an integer of 1 to 5.

The letter i is preferably an integer of 2 to 4, and more preferably 3.

The group represented by formula (3-1) is preferably a group in which R$^{34}$ is an isoprene-derived structural unit and i is 1, a group in which R$^{34}$ is an isoprene-derived structural unit and i is 2, or a group in which R$^{34}$ is an isoprene-derived structural unit and i is 3.

Examples of alkali, metal atoms for M include lithium, sodium, potassium and cesium, and preferably lithium.

Of the compounds represented by formula. (3), compounds in which R$^{31}$ is a group represented by formula. (3-1), R$^{21}$ and R$^{22}$ each independently represent a hydrocarbyl group and M represents lithium, include compounds obtained by reacting isoprene with (dialkylamino)alkyllithium compounds. Examples of such compounds include 3-(dimethylamino)propyllithium, 3-(diethylamino)propyllithium, 3-(dibutylamino)propyllithium, 4-(dimethylamino)butyllithium, 4-(diethylamino)butyllithium, 4-(dipropylamino)butyllithium and 3-(dibutylamino)butyllithium.

Of the compounds represented by formula (3), compounds in which R$^{31}$ is a group represented by formula (3-1), R$^{21}$ and R$^{22}$ represent a hydrocarbylene group formed by bonding between a portion of R$^{21}$ and a portion of R$^{22}$ and M represents lithium, include compounds obtained by reacting isoprene with alkyllithium compounds having cycloamino groups. Alkyllithium compounds with cycloamino groups include 3-(1-pyrrolidinyl)propyllithium, 3-(1-piperidinyl)propyllithium, 3-(1-hexamethyleneimino)propyllithium and 3-[1-(1,2,3,6-tetrahydropyridinyl)]propyllithium.

Of the compounds represented by formula (3), compounds in which R$^{31}$ is a group represented by formula (3-1), R$^{21}$ and R$^{22}$ represent a hydrocarbylene group with a nitrogen atom and/or oxygen atom, formed by bonding between a portion of R$^{21}$ and a portion of R$^{22}$ and M represents lithium, include compounds obtained by reacting isoprene with alkyllithium compounds having cycloamino groups. Alkyllithium compounds with cycloamino groups include 3-(1-morpholino)propyllithium, 3-(imidazolyl)propyllithium and 3-(4,5-dihydro-1-imidazolyl)propyllithium.

Of the compounds represented by formula (3), compounds in which $R^{31}$ is a group represented by formula (3-1), $R^{21}$ and $R^{22}$ represent a group of 5 to 20 carbon atoms represented by $-Si(R^{35})_2-(CH_2)_x Si(R^{35})_2-$, formed by bonding between a portion of $R^{21}$ and a portion of $R^{22}$ (where $R^3$ represents a hydrocarbyl group and x is an integer of 1 to 10) and M represents lithium, include compounds obtained by reacting 3-(2,2,5,5-tetramethyl-1-aza-2,5-disila-1-cyclopentyl)propyllithium with isoprene, butadiene or styrene.

Of the compounds represented by formula (3), compounds in which $R^{31}$ is a group represented by formula (3-1), $R^{21}$ and $R^{22}$ represent a group of 4 to 20 carbon atoms represented by $-Si(R^{36})_2-(CH_2)_y-$, formed by bonding between a portion of $R^{21}$ and a portion of $R^{22}$ (where $R^{36}$ represents a hydrocarbyl group and y is an integer of 2 to 11) and M represents lithium, include compounds obtained by reacting 3-(2,2-dimethyl-1-aza-2-sila-1-cyclopentyl)propyllithium with isoprene, butadiene or styrene.

The compound represented by formula (3) preferably is a compound in which $R^{31}$ is a group represented by formula (3-1), $R^{21}$ and $R^{22}$ each independently represent a hydrocarbyl group and M represents lithium, more preferably it is a compound in which $R^{21}$ and $R^{22}$ each independently represent an alkyl group of 1 to 4 carbon atoms, M represents lithium, $R^{31}$ is a group represented by formula (3-1), $R^{34}$ in formula (3-1) represents an isoprene-derived structural unit, f is 1 to 5 and i is 2 to 4, and even more preferably it is a compound obtained by reacting isoprene with 3-(dimethylamino)propyllithium or 3-(diethylamino)propyllithium.

Two or more of these may be used in combination as a compound represented by formula (3).

A conjugated diene-based polymer with active ends may be used as a polymerization initiator. A conjugated diene-based polymer with active ends can be obtained by reacting a polymerization initiator with a monomer including a conjugated diene compound. The polymerization initiator used may be the same as the compounds mentioned above. There are no particular restrictions on the monomer to be used in the conjugated diene-based polymer with active ends, and examples for the monomer include the aforementioned conjugated diene compounds, aromatic vinyl compounds, and compounds that are copolymerizable with conjugated diene compounds. The conjugated diene-based polymer with active ends preferably includes isoprene alone, or isoprene and an aromatic vinyl compound, as monomer units.

The amount of polymerization initiator to be used for polymerization of the monomers is preferably 0.01 mmol to 15 mmol per 100 g as the total amount of the monomers.

(Solvent)

The polymerization in steps 1, 1' and 1" is preferably carried out in a solvent. The solvent used may be any one that does not interfere with the polymerization in steps 1, 1' and 1", and it is preferably a hydrocarbon solvent.

Aliphatic hydrocarbons, aromatic hydrocarbons and alicyclic hydrocarbons may be used as hydrocarbon solvents. Examples of aliphatic hydrocarbons include propane, n-butane, iso-butane, n-pentane, iso-pentane, n-hexane, propene, 1-butene, iso-butene, trans-2-butene, cis-2-butene, 1-pentane, 2-pentene, 1-hexene and 2-hexene. Examples of aromatic hydrocarbons include benzene, toluene, xylene and ethylbenzene. Examples of alicyclic hydrocarbons include cyclopentane and cyclohexane. A single hydrocarbon solvent may be used alone, or two or more may be used in combination. The hydrocarbon solvent may also be a mixture of an aliphatic hydrocarbon such as industrial hexane, and an alicyclic hydrocarbon.

(Polymerization)

When polymerization of the monomers is to be carried out in a solvent, the concentration of the monomers in the solvent will usually be 1 to 50 mass %, and is preferably 5 to 30 mass %.

The polymerization temperature will usually be 25 to 100° C., preferably 35 to 90° C. and more preferably 50 to 80° C. The polymerization time will usually be 10 minutes to 5 hours.

(Modifying Agent)

The modifying agent used for this embodiment may be a compound having a silicon atom, tin atom, germanium atom or phosphorus atom. The modifying agent preferably includes a compound having a functional group capable of reacting with the active ends of the conjugated diene-based polymer, and/or a functional group that is copolymerizable with the conjugated diene compound. Two or more different types of such modifying agents may also be used in combination.

The modifying agent may include a compound having the structure represented by formula (5).

[Chemical Formula 4]

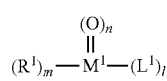

(5)

In formula (5), $R^1$ represents an alkyl, alkenyl, cycloalkenyl or aryl group, $M^1$ represents a silicon atom, tin atom, germanium atom or phosphorus atom, $L^1$ represents a halogen atom or a hydrocarbyloxy group, and when multiple $R^1$ and $L^1$ groups are present they may be the same or different, when $M^1$ is a silicon atom, tin atom or germanium atom, n represents 0 and m and l are each independently an integer of 0 to 4 such that m+l=4 is satisfied, and when $M^1$ is a phosphorus atom, n represents 0 or 1 and m and l are each independently an integer of 0 to 3 such that m+l=3 is satisfied.

An alkyl group in $R^1$ is preferably an alkyl group of 1 to 12 carbon atoms, with examples including methyl, ethyl, n-propyl, isopropyl, n-butyl, sec-butyl, tert-butyl, n-pentyl, n-hexyl, n-octyl, n-dodecyl, cyclopentyl and cyclohexyl groups. Preferred alkenyl groups are alkenyl groups of 2 to 12 carbon atoms, with examples including vinyl, allyl, 1-propenyl and isopropenyl groups. Preferred aryl groups are aryl groups of 6 to 12 carbon atoms, with examples including phenyl, methylphenyl, ethylphenyl, benzyl, tolyl and xylyl groups.

Examples of halogen atoms for $L^1$ include chlorine, bromine and iodine. Examples of hydrocarbyloxy groups include alkoxy and aryloxy groups. Preferred alkoxy groups are alkoxy groups of 1 to 12 carbon atoms, with examples including methoxy, ethoxy, n-propoxy, isopropoxy, n-butoxy, sec-butoxy, tert-butoxy, pentyloxy, hexyloxy, heptyloxy and octyloxy groups. Preferred aryloxy groups are aryloxy groups of 6 to 12 carbon atoms, with examples including phenoxy and benzyloxy groups.

Examples of compounds with structures represented by formula (5) include silane compounds wherein $M^1$ is a silicon atom, tin compounds wherein $M^1$ is a tin atom, germanium compounds wherein $M^1$ is a germanium atom and phosphorus compounds wherein $M^1$ is a phosphorus atom.

Examples of silane compounds include silicon tetrachloride, silicon tetrabromide, silicon tetraiodide, methyltrichlorosilane, dimethyldichlorosilane, ethyltrichlorosilane, butyltrichlorosilane, hexyltrichlorosilane, tetramethoxysilane, methyltrimethoxysilane, dimethoxydimethylsilane, chlorotrimethoxysilane, methyltriethoxysilane, ethyltrimethoxysilane, dirnethoxydiethylsilane, diethoxydimethylsilane, tetraethoxysilane, ethyltriethoxysilane, diethoxydiethylsilane, dichlorodimethoxysilane and trichloromethoxysilane.

Examples of tin compounds include tin tetrachloride, monomethyltrichlorotin, monoethyhrichlorotin, monobutyltrichlorotin, monophenyltrichlorotin, tetramethoxytin and tetraethoxytin.

Examples of germanium compounds include germanium tetrachloride, germanium tetrabromide, germanium tetraiodide, methyltrichlorogermanium, ethyltrichlorogermanium, phenyltrichlorogermanium, dimethyldichlorogermanium, diethyldichlorogermanium, dibutyldichlorogeimanium, diphenyldichlorogermanium, tetramethoxygermanium, tetraethoxygermanium, tetraisopropoxygermanium and tetrabutoxygermanium.

Examples of phosphorus compounds include halogenated phosphorus compounds such as tichlorphosphine and tribromophosphine, phosphorous acid ester compounds such as trisnonylphenyl phosphite, trimethyl phosphite and triethyl phosphite, and phosphoric acid ester compounds such as trimethyl phosphate and triethyl phosphate.

The modifying agent may include a compound having the structure represented by formula (6).

[Chemical Formula 5]

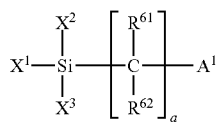

(6)

In formula (6), $X^1$, $X^2$ and $X^3$ each independently represent a hydrocarbyl group, a hydrocarbyloxy group, a halogen atom or a functional group capable of reacting with the active ends of the conjugated diene-based polymer, $R^{61}$ and $R^{62}$ each independently represent a hydrogen atom or a hydrocarbyl group, and when multiple $R^{61}$ and $R^{62}$ groups are present they may be the same or different. $A^1$ represents an organic group having at least one atom selected from the group consisting of oxygen atoms, nitrogen atoms, phosphorus atoms, sulfur atoms and silicon atoms (an organic group including any one or more from among oxygen atoms, nitrogen atoms, phosphorus atoms, sulfur atom and silicon atoms), and $A^1$ may also have a ring structure, with a portion of the structure of $X^1$, $X^2$ or $X^3$ optionally bonded to a portion of $A^1$. In other words, $A^1$ may be bonded to the silicon atom of formula (6) through $X^1$, $X^2$ or $X^3$. The letter "a" represents an integer of 0 to 10.

Examples of hydrocarbyl groups for $X^1$, $X^2$ and $X^3$ include alkyl, aryl, alkenyl and aralkyl groups. An alkyl group is preferably an alkyl group of 1 to 12 carbon atoms, with examples including methyl, ethyl, n-propyl, isopropyl, n-butyl, sec-butyl, tert-butyl, n-pentyl, n-hexyl, n-octyl, n-dodecyl, cyclopentyl and cyclohexyl groups. Preferred aryl groups are aryl groups of 6 to 12 carbon atoms, with examples including phenyl, methylphenyl, ethylphenyl, benzyl, tolyl and xylyl groups. Preferred alkenyl groups are alkenyl groups of 2 to 12 carbon atoms, with examples including vinyl, allyl, 1-propenyl and isopropenyl groups. Examples of aralkyl groups include benzyl groups.

Examples of hydrocarbyloxy groups include alkoxy and aryloxy groups. Preferred alkoxy groups are alkoxy groups of 1 to 12 carbon atoms, with examples including methoxy, ethoxy, n-propoxy, isopropoxy, n-butoxy, sec-butoxy and tert-butoxy groups. Preferred aryloxy groups are aryloxy groups of 6 to 12 carbon atoms, with examples including phenoxy and benzyloxy groups. A hydrocarbyloxy group is preferably an alkoxy group, and more preferably a methoxy or ethoxy group.

Examples of halogen atoms include chlorine, bromine and iodine.

Examples for the functional group capable of reacting with the active ends of the conjugated diene-based polymer include hydrocarbon groups with epoxy groups and hydrocarbon groups with carbonyl groups.

A hydrocarbyl group for $R^{61}$ and $R^{62}$ is preferably a hydrocarbyl group of 1 to 4 carbon atoms, more preferably an alkyl group of 1 to 4 carbon atoms, and even more preferably a methyl or ethyl group. When multiple $R^{61}$ groups are present, the multiple $R^{61}$ groups may be the same or different, and when multiple $R^{62}$ groups are present the multiple $R^{62}$ groups may be the same or different. From the viewpoint of increasing fuel efficiency, "a" is preferably 3 or greater, while from the viewpoint of increasing economy during production, it is preferably no greater than 4.

Examples for $A^1$, as an organic group having at least a nitrogen atom, include groups represented by formula (6-1).

[Chemical Formula 6]

(6-1)

In formula (6-1), $R^{63}$ and $R^{61}$ each independently represent an optionally substituted hydrocarbyl group or trihydrocarbylsilyl group, or a hydrocarbylene group formed by bonding between a portion of $R^{63}$ and a portion of $R^{64}$, and optionally having at least one atom selected from the group consisting of silicon atoms, nitrogen atoms and oxygen atoms.

When the group represented by formula (6-1) does not have bonding between a portion of $R^{63}$ and a portion of $R^{64}$ it is an acyclic amino group, and when it has bonding between $R^{63}$ and $R^{64}$, it is a cycloamino group.

An optionally substituted hydrocarbyl group for $R^{63}$ and $R^{64}$ is a hydrocarbyl group, or a substituted hydrocarbyl group.

Examples of hydrocarbyl groups include alkyl groups of 1 to 12 carbon atoms such as methyl, ethyl, n-propyl, isopropyl and n-butyl groups; alkenyl groups of 2 to 12 carbon atoms such as vinyl, allyl and isopropenyl groups; and aryl groups of 6 to 12 carbon atoms such as phenyl and benzyl groups, with alkyl or aryl groups being preferred, and methyl, ethyl or benzyl groups being more preferred.

Examples of substituted hydrocarbyl groups include oxacycloalkyl groups such as oxiranyl and tetrahydrofuranyl groups, with tetrahydrothranyl being preferred.

Throughout the present specification, an oxacycloalkyl group is a group wherein one $CH_2$ on the alicyclic ring of a cycloalkyl group has been replaced by an oxygen atom.

Examples of trihydrocarbylsilyl groups for $R^{63}$ and $R^{64}$ include trimethylsilyl and tort-butyl-dimethylsilyl groups, with trimethylsilyl being preferred.

A hydrocarbylene group formed by bonding between a portion of $R^{63}$ and a portion of $R^{64}$ and optionally having at least one atom selected from the group consisting of silicon atoms, nitrogen atoms and oxygen atoms is a hydrocarbylene group, or a hydrocarbylene group having at least one atom selected from the group consisting of silicon atoms, nitrogen atoms and oxygen atoms (heteroatom-containing hydrocarbylene group).

Examples of hydrocarbylene groups include alkylene groups of 2 to 12 carbon atoms such as tetramethylene, pentamethylene, hexamethylene and 2,2,4-trimethylhexane-1,6-diyl; among which alkylene groups of 4 to 7 carbon atoms are preferred and a pentamethylene or hexamethylene group is especially preferred.

Examples of heteroatom-containing hydrocarbylene groups include silicon atom-containing hydrocarbylene, nitrogen atom-containing hydrocarbylene and oxygen atom-containing hydrocarbylene groups.

Examples of silicon atom-containing hydrocarbylene groups include the group represented by $-Si(CH_3)_2-CH_2-CH_2-Si(CH_3)_2-$. Examples of nitrogen atom-containing hydrocarbylene groups include the group represented by $-CH=N-CH=CH-$ and the group represented by $-CH=N-CH_2-CH_2-$. Examples of oxygen atom-containing hydrocarbylene groups include the group represented by $-CH_2-CH_2-O-CH_2-CH_2-$.

Examples for $A^1$, as an organic group having at east an oxygen atom, include groups represented by formula (6-2).

[Chemical Formula 7]

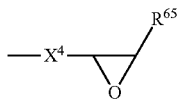

(6-2)

In formula (6-2), $X^4$ represents a hydrocarbylene group of 1 to 6 carbon atoms optionally having an oxygen atom, and $R^5$ represents hydrogen or a hydrocarbyl group of 1 to 6 carbon atoms.

Examples of hydrocarbylene groups of 1 to 6 carbon atoms optionally having an oxygen atom, for $X^4$, include unsubstituted hydrocarbylene, and hydrocarbylene groups having an oxygen atom-containing group as a substituent.

Specifically, $X^4$ may be a hydrocarbylene group or a hydrocarbyleneoxy group, and more specifically, it may be an ethylene, propylene, butylene, 1-oxyethylene, 1-oxytrimethylene or 1-oxytetraethylene group. $X^4$ is preferably a 1-oxytrimethylene group.

Examples of hydrocarbyl groups of 1 to 6 carbon atoms for $R^{65}$ include alkyl and aryl groups, and more specifically, methyl, ethyl, n-propyl, isopropyl, n-butyl, sec-butyl, t-butyl, n-pentyl, neopentyl, isopentyl, n-hexyl, cyclohexyl and phenyl groups. $R^{65}$ is preferably a hydrogen atom or a methyl group.

Examples for $A^1$, as an organic group having at least a sulfur atom, include groups represented by formula (6-3).

[Chemical Formula 8]

(6-3)

In formula (6-3), $R^{66}$ represents a trihydrocarbylsilyl group. Trihydrocarbylsilyl groups include trimethylsilyl, triethylsilyl and tert-butyl-dimethylsilyl groups, with trimethylsilyl or triethylsilyl being preferred.

Examples for $A^1$, as an organic group having at least a silicon atom, include groups represented by formula (6-4). That is, examples of compounds represented by formula (6) include polyorganosiloxane compounds having groups represented by formula (6-4) as $A^1$.

[Chemical Formula 9]

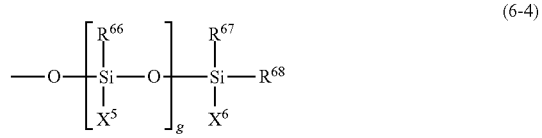

(6-4)

In formula (6-4), $R^{66}$, $R^{67}$ and $R^{68}$ each independently represent a group having a repeating unit of a hydrocarbyl group or a hydrocarbyleneoxy group, $X^5$ and $X^6$ each independently represent a group having a repeating unit of a hydrocarbyl, hydrocarbyloxy or hydrocarbyleneoxy group, a halogen atom, or a functional group capable of reacting with the active ends of the conjugated diene-based polymer, g represents an integer of 0 to 600, and when multiple $R^{66}$ and $X^5$ groups are present, they may be the same or different.

Examples of hydrocarbyl groups for $R^{66}$, $R^{67}$, $R^{68}$, $X^5$ and $X^6$ include alkyl, aryl and aralkyl groups. An alkyl group is preferably an alkyl group of 1 to 12 carbon atoms, with examples including methyl, ethyl, n-propyl, isopropyl, n-butyl, sec-butyl, tert-butyl, n-pentyl, n-hexyl, n-octyl, n-dodecyl, cyclopentyl and cyclohexyl groups. Preferred aryl groups are aryl groups of 6 to 12 carbon atoms, with examples including phenyl, methylphenyl, ethylphenyl, tolyl and xylyl groups. Preferred aralkyl groups are aralkyl groups of 7 to 13 carbon atoms, with an example being benzyl group.

The group having a repeating unit of a hydrocarbyleneoxy group for $R^{66}$, $R^{67}$, $R^{68}$, $X^5$ and $X^6$ may be, for example, a group having a repeating unit based on an alkylene glycol. Examples of hydrocarbyleneoxy groups include 1-oxyethylene, 1-oxytrimethylene and 1-oxytetramethylene groups, with 1-oxyethylene being preferred.

Examples of hydrocarbyloxy groups for $X^5$ and $X^6$ include alkoxy and aryloxy groups. Preferred alkoxy groups are alkoxy groups of 1 to 12 carbon atoms, with examples including methoxy, ethoxy, n-propoxy, isopropoxy, n-butoxy, sec-butoxy tert-butoxy, pentyloxy, hexyloxy, heptyloxy and octyloxy groups. Preferred aryloxy groups are aryloxy groups of 6 to 12 carbon atoms, with examples including phenoxy and benzyloxy groups.

Examples of halogen atoms include chlorine, bromine and iodine. Examples for the functional group capable of reacting with the active ends of the conjugated diene-based polymer include hydrocarbon groups with epoxy groups and hydrocarbon groups with carbonyl groups.

From the viewpoint of handleability, g is preferably 3 to 360, and from the viewpoint of fuel efficiency performance it is preferably 4 to 20.

Among compounds having the structure represented by formula (6), examples of compounds wherein $A^1$ is an acyclic amino group represented by formula (6-1) include [3-(dimethyl amino)propyl]trimethoxysilane, [3-(diethylamino)propyl]trimethoxysilane, [3-(dimethylamino)propyl]triethoxysilane, [3-(diethylamino)propyl]triethoxysilane, [3-(ethylmethylamino)propyl]trimethoxysilane, [3-(ethylmethylamino)propyl]triethoxysilane, [3-(dimethylamino)propyl]methyldimethoxysilane, [3-(diethylamino)propyl]methyldimethoxysilane, [3-(dimethylamino)propyl]ethyldimethoxysilane, [3-(diethylamino)propyl]ethyldimethoxysilane, [3-(dimethylamino)propyl]dimethylmethoxysilane, [3-(diethylamino)propyl]methyldiethoxysilane, [3-(diethylamino)propyl]methyldiethoxysilane, [3-(dimethylamino)propyl]ethyldiethoxysilane, [3-(diethylamino)propyl]ethyldiethoxysilane, [3-(ethylmethylamino)propyl]methyldiethoxysilane, [3-(ethylmethylamino)propyl]ethyldiethoxysilane, [3-(N-allyl-N-methylamino)pentyl]trimethoxysilane, [3-(N-benzyl-N-methylamino)propyl]trimethoxysilane, [3-(N-benzyl-N-methylamino)propyl]triethoxysilane, [3-(N-phenyl-N-propylamino)pentyl]trimethoxysilane, {3-[di(methoxymethyl)amino]propyl}trimethoxysilane, {3-[di(methoxyethyl)amino]propyl}trimethoxysilane, {3-[di(methoxymethyl)amino]propyl}triethoxysilane, {3-[di(methoxyethyl)amino]propyl}triethoxysilane, {3-[di(ethoxyethyl)amino]propyl}trimethoxysilane, {3-[di(ethoxymethyl)amino]propyl}trimethoxysilane, {3-[di(ethoxyethyl)amino]propyl}triethoxysilane, {3-[di(ethoxymethyl)amino]propyl}triethoxysilane, {3-[N,N-bis(trimethylsilyl)amino]propyl}trimethoxysilane, {3-[N,N-bis(trimethylsilyl)amino]propyl}triethoxysilane, {3-[N,N-bis(t-butyldimethylsilyl)amino]propyl}trimethoxysilane, {3-[N,N-bis(t-butyldimethylsilyl)amino]propyl}triethoxysilane, {3-[N,N-bis(trimethylsilyl)amino]propyl}methyldimethoxysilane, {3-[N,N-bis(trimethylsilyl)amino]propyl}methyldiethoxysilane, {3-[N,N-bis(t-butyldimethylsilyl)amino]propyl}methyldimethoxysilane, {3-[N,N-bis(t-butyldimethylsilyl)amino]propyl}methyldiethoxysilane, {3-[N,N-bis(trimethylsilyl)amino]propyl}dimethylmethoxysilane, [3-(ethylmethylamino)propyl]trimethoxysilane, [3-(ethylmethylamino)propyl]triethoxysilane, [3-(ethylmethylamino)propyl]methyldimethoxysilane, [3-(ethylmethylamino)propyl]ethyldimethoxysilane, [3-(ethylmethylamino)propyl]methyldiethoxysilane and [3-(ethylmethylamino)propyl]ethyldiethoxysilane.

Among compounds having the structure represented by formula (6), compounds wherein $A^1$ is an acyclic amino group represented by formula (6-1) are preferably [3-(dimethylamino)propyl]trimethoxysilane, [3-(diethylamino)propyl]trimethoxysilane, [3-(dimethylamino)propyl]triethoxysilane or [3-(diethylamino)propyl]triethoxysilane, from the viewpoint of increasing fuel efficiency.

Among compounds having the structure represented by formula (6), examples of compounds wherein $A^1$ is a cycloamino group represented by formula (6-1) include 3-morpholinopropyltrimethoxysilane, 3-morpholinopropyltriethoxysilane, 3-morpholinopropylmethyldimethoxysilane, 3-morpholinopropylethyldimethoxysilane, 3-morpholinopropylmethyldiethoxysilane, 3-morpholinopropylethyldiethoxysilane, 3-piperidinopropyltrimethoxysilane, 3-piperidinopropyltriethoxysilane, 3-piperidinopropylmethyldimethoxysilane, 3-piperidinopropylethyldimethoxysilane, 3-piperidinopropylmethyldiethoxysilane, 3-piperidinopropylethyldiethoxysilane, N-(3-trimethoxysilylpropyl)-4,5-dihydroimidazole, N-(3-triethoxysilylpropyl)-4,5-dihydroimidazole, N-(3-trimethoxysilylpropyl)-4,5-imidazole, N-(3-triethoxysilylpropyl)-4,5-imidazole, 3-hexamethyleneiminopropyltrimethoxysilane, 3-hexamethyleneiminopropyltriethoxysilane, 3-hexamethyleneiminopropylmethyldimethoxysilane, 3-hexamethyleneiminopropylethyldimethoxysilane, 3-hexamethyleneiminopropylmethyldiethoxysilane and 3-hexamethyleneiminopropylethyldiethoxysilane.

Among compounds having the structure represented by formula (6), compounds wherein $A^1$ is a cycloamino group represented by formula (6-1) are preferably N-(3-trimethoxysilylpropyl)-4,5-dihydroimidazole, N-(3-triethoxysilylpropyl)-4,5-dihydroimidazole, N-(3-trimethoxysilylpropyl)-4,5-imidazole or N-(3-triethoxysilylpropyl)-4,5-imidazole, from the viewpoint of increasing fuel efficiency.

Among compounds having the structure represented by formula (6), examples of compounds wherein $A^1$ is a group represented by formula (6-2) include 3-glycidoxypropyltrimethoxysilane, 3-glycidoxypropyltriethoxysilane, 3-glycidoxypropylmethyldimethoxysilane, 3-glycidoxypropylethyldimethoxysilane, 3-glycidoxypropylmethyldiethoxysilane, 3-glycidoxypropylethyldiethoxysilane, bis(3-glycidoxypropyl)dimethoxysilane and bis(3-glycidoxypropyl)diethoxysilane.

Among compounds having the structure represented by formula (6), a compound wherein $A^1$ is a group represented by formula (6-2) is preferably 3-glycidoxypropyltrimethoxysilane, from the viewpoint of increasing fuel efficiency, and from the viewpoint of ready availability of the compound and increasing long-term storage stability.

Among compounds having the structure represented by formula (6), examples of compounds wherein $A^1$ is a group represented by formula (6-3) include S-trimethylsilylmercaptopropyltrimethoxysilane, S-trimethylsilylmercaptopropyltriethoxysilane, S-trimethylsilylmercaptopropylmethyldimethoxysilane, S-trimethylsilylmercaptopropylmethyldiethoxysilane, S-triethylsilylmercaptopropyltrimethoxysilane, S-triethylsilylmercaptopropyltriethoxysilane, S-triethylsilylmercaptopropylmethyldimethoxysilane and S-triethylsilylmercaptopropylmethyldiethoxysilane.

Among compounds having the structure represented by formula (6), examples of compounds wherein $A^1$ is a group represented by formula (6-4) include diglycidoxypolydimethylsiloxane, dimethyl(methoxy-methylsiloxane)polydimethylsiloxane, dimethyl(acetoxy-methylsiloxane)polydimethylsiloxane, diglycidylpolysiloxane and dichloropolydimethylsiloxane.

Examples of compounds having die structure represented by formula (6) other than the compounds mentioned above include tris[(alkoxysilyl)alkyl]isocyanurate compounds such as tris[3-(trimethoxysilyl)propyl]isocyanurate, tris[3-(triethoxysilyl)propyl]isocyanurate, tris[3-(tripropoxysilyl)propyl]isocyanurate and tris[3-(tributoxysilyl)propyl]isocyanurate. Of these, a compound represented by formula (6) is preferably tris[3-(trialkoxysilyl)propyl]isocyanurate, more preferably tris[3-(trialkoxysilyl)propyl]isocyanurate in which the alkoxy group is an alkoxy group of 1 to 4 carbon atoms, and even more preferably tris[3-(trimethoxysilyl)propyl]isocyanurate.

Examples of compounds having the structure represented by formula (6) other than the compounds mentioned above include bis(trichlorosilyl)methane, 1,2-bis(trichlorosilyl)ethane, 1,3-bis(trichlorosilyl)propane, 1,4-bis(trichlorosilyl)butane, 1,5-bis(trichlorosilyl)pentane, 1,6-bis(trichlorosilyl)

hexane, bis(trimethoxysilyl)methane, bis(triethoxysilyl) methane, bis(trimethoxysilyl)ethane, bis(triethoxysilyl) ethane, bis(trimethoxysilyl)propane, bis(triethoxysilyl) propane, bis(trimethoxysilyl)butane, bis(triethoxysilyl) butane, bis(trimethoxysilyl)heptane, bis(triethoxysilyl) heptane, bis(trimethoxysilyl)hexane, bis(triethoxysilyl) hexane, bis(trimethoxysilyl)benzene, bis(triethoxysilyl) benzene, bis(trimethoxysilyl)cyclohexane, bis (triethoxysilyl)cyclohexane, bis(triethoxysilyl)benzene, bis (trimethoxysilyl)octane, bis(triethoxysilyl)octane, bis (trimethoxysilyl)nonane, bis(triethoxysilyl)nonane, bis (trimethoxysilyl)ethylene, bis(triethoxysilyl)ethylene, bis (trimethoxysilylethyl)benzene, bis(triethoxysilylethyl) benzene, bis(3-trimethoxysilylpropyl)ethane, bis(3-triethoxysilylpropyl)ethane, 3-aminopropyltrimethoxysilane, 3-aminopropyltriethoxysilane, 3-mercaptomethyltrimethoxysilane, 3-mercaptomethyltriethoxysilane, 3-mercaptopropyltrimethoxysilane, 3-mercaptopropyltriethoxysilane, aminophenyltrimethoxysilane, aminophenyltriethoxysilane, 3-(N-methylamino) propyltrimethoxysilane, 3-(N-methylamino)propyltriethoxysilane, N-(2-aminoethyl)-3-aminopropyltrimethoxysilane, 2-(6-aminohexyl)aminopropyltrimethoxysilane, 3-[N-2-{N',N'-bis(trimethylsilyl)amino}ethyl-N-trimethylsilylamino]propyltriethoxysilane, 3-[N-2-{N',N'-bis(triethylsilyl)amino}ethyl-N-triethylsilylamino]propyl triethoxysilane, 3-[N-2-{N',N'-bis(triethylsilyl) amino}ethyl-N-triethylsilylamino]propyl trichlorosilane, N-(3-trimethoxysilylpropyl)-4-methylpentane-2-imine, N-(3-triethoxysilylpropyl)-4-methylpentane-2-imine, N-(3-triethoxysilylpropyl)propane-2-imine, N-(3-triethoxysilylpropyl)pentane-3-imine, N-(3-trichlorosilylpropyl)-4-methylpentane-2-imine, 1,4-bis[3-(trimethoxysilyl)propyl] piperazine, 1,4-bis[3-(triethoxysilyl)propyl]piperazine, bis [3-(trimethoxysilyl)propyl]-N-trimethylsilylamine, bis[3-(triethoxysilyl)propyl]-N-trimethylsilylamine, bis[3-(trimethoxysilyl)propyl]methylamine, bis[3-(triethoxysilyl) propyl]methylamine, bis[3-(trimethoxysilyl)propyl] ethylamine, bis[3-(triethoxysilyl)propyl]ethylamine, tris (trimethoxysilylmethyl)amine, tris(triethoxysilylmethyl) amine, 2,2-dimethoxy-3-phenyl-1-aza-2-silacyclopentane, 2,2-diethoxy-1-phenyl-3-aza-2-silacyclopentane, 2,2-dimethoxy-1-butyl-1-aza-2-silacyclopentane, 2,2-diethoxy-1-butyl-1-aza-2-silacyclopentane, 2,2-dimethoxy-1-trimethylsilyl-1-aza-2-silacyclopentane, 2,2-dimethoxy-1-(3-trimethoxysilylpropyl)-1-aza-2-silacyclopentane, 2,2-diethoxy-1-(3-triethoxysilylpropyl)-1-aza-2-silacyclopentane, 2,2-dimethoxy-8-(4-methylpiperazinyl) methyl-1,6-dioxa-2-silacyclooctane, 2,2-diethoxy-8-(4-methylpiperazinyl)methyl-1,6-dioxa-2-silacyclooctane, 2,2-dimethoxy-8-(N,N-diethyl)methyl-1,6-dioxa-2-silacyclooctane, 2-methoxy-2-methyl-8-(4-methylpiperazinyl)methyl-1,6-dioxa-2-silacyclooctane, 2,2-dichloro-8-(4-methylpiperazinyl)methyl-1,6-dioxa-2-silacyclooctane, N-[2-(trimethoxysilanyl)-ethyl]-N,N',N'-trimethylethane-1,2-diamine, 2-[3-(trimethoxysilyl)propyl]-1,3-dimethylimidazolidine and 2-[3-(trimethoxysilyl) propyl]-1,3-(bistrimethylsilyl)imidazolidine.

The modifying agent may include a compound having the structure represented by formula (7).

[Chemical Formula 10]

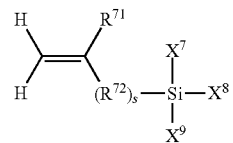

(7)

In formula (7), $R^{71}$ represents a hydrogen atom or a hydrocarbyl group, s represents 0 or 1 (an integer of 0 to 1), $R^{72}$ represents a hydrocarbylene group, and $X^7$, $X^8$ and $X^9$ each independently represent a substituted amino group, or an optionally substituted hydrocarbyl group, with at least one of $X^7$, $X^8$ and $X^9$ being a substituted amino group.

Examples of hydrocarbyl groups for $R^{71}$ include alkyl, alkenyl and aryl groups.

Preferred alkyl groups are alkyl groups of 1 to 12 carbon atoms, examples of which include methyl, ethyl, n-propyl, isopropyl, n-butyl, sec-butyl and tert-butyl groups, with methyl being preferred. Preferred Amyl groups are alkenyl groups of 2 to 12 carbon atoms, examples of which include vinyl, allyl, 1-propenyl and isopropenyl groups, with vinyl being preferred. Preferred aryl groups are aryl groups of 6 to 12 carbon atoms, examples of which include phenyl, methylphenyl and ethylphenyl groups, with phenyl being preferred.

$R^{71}$ is preferably a hydrogen atom or a methyl, vinyl or phenyl group, and it is more preferably a hydrogen atom.

Examples of hydrocarbylene groups for $R^{72}$ include alkylene and arylene groups, and groups in which arylene and alkylene groups are bonded.

Preferred alkylene groups are alkylene groups of 2 to 6 carbon atoms, examples of which include methylene, ethylene and trimethylene groups, and more preferably methylene and ethylene groups. Preferred arylene groups include arylene groups of 5 to 12 carbon atoms, examples of which include phenylene, naphthylene and biphenylene groups, and more preferably phenylene. Examples of groups in which an arylene group and an alkylene group are bonded include groups in which a phenylene group and an alkylene group are bonded, groups in which a naphthylene group and an alkylene group are bonded, and groups in which a biphenylene group and an alkylene group are bonded, and preferably groups in which a phenylene group and an alkylene group are bonded.

In a group in which an arylene group and an alkylene group are bonded, preferably the carbon atom of the arylene group is bonded to the carbon atom to which $R^{71}$ of formula (7) is bonded.

Examples of groups in which a phenylene group and an alkylene group are bonded (phenylene-alkylene groups) include groups represented by formula (7-R).

[Chemical Formula 11]

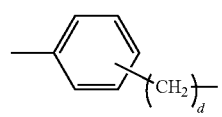

(7-R)

In the formula, "d" represents an integer of 1 to 10.

Phenylene-alkylene groups may be para-phenylene-alkylene, meta-phenylene-alkylene or ortho-phenylene-alkylene groups, depending on the position of the carbon atom on the benzene ring to which the alkylene group is bonded. In the case of a group represented by formula (7-R), the para-phenylene-alkylene group is a group represented by formula (7-Ra), the meta-phenylene-alkylene group is a group represented by formula (7-Rb), and the ortho-phenylene-alkylene group is a group represented by formula (7-Rc).

[Chemical Formula 12]

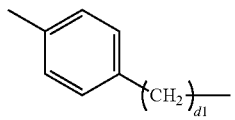

(7-Ra)

[Chemical Formula 13]

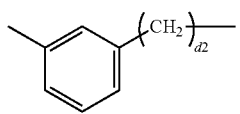

(7-Rb)

[Chemical Formula 14]

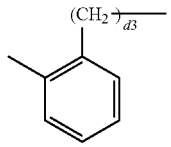

(7-Rc)

In the formulas, d1, d2 and d3 each independently represent an integer of 1 to 10.

A group in which an arylene group and an alkylene group are bonded is preferably a group in which a phenylene group and an alkylene group are bonded (phenylene-alkylene group), more preferably it is a group represented by formula (7-Ra) or a group represented by formula (7-Rb), and more preferably it is a para-phenylene-methylene group (a group represented by formula (7-Ra) wherein d1=1), a meta-phenylene-methylene group (a group represented by formula (7-Rb) wherein d2=1), a para-phenylene-ethylene group (a group represented by formula (7-Ra) wherein d1=2) or a meta-phenylene-ethylene group (a group represented by formula (7-Rb) wherein d2=2).

Optionally substituted hydrocarbyl groups for $X^7$, $X^8$ and $X^9$ include hydrocarbyl groups and substituted hydrocarbyl groups.

Examples of hydrocarbyl groups for $X^7$, $X^8$ and $X^9$ include alkyl, alkenyl, alkynyl, aryl and aralkyl groups. Preferred alkyl groups are alkyl groups of 1 to 12 carbon atoms, examples of which include methyl, ethyl, n-propyl, isopropyl, n-butyl, sec-butyl and tert-butyl groups. Preferred alkenyl groups are alkenyl groups of 2 to 12 carbon atoms, with examples including vinyl, allyl, 1-propenyl and isopropenyl groups. Preferred alkynyl groups are alkynyl groups of 2 to 12 carbon atoms, with examples including ethynyl and 2-propynyl groups. Preferred aryl groups are aryl groups of 6 to 12 carbon atoms, examples of which include phenyl, tolyl and xylyl groups. Preferred aralkyl groups are aralkyl groups of 7 to 13 carbon atoms, with an example being benzyl group. A hydrocarbyl group is preferably an alkyl group.

Substituted hydrocarbyl groups for $X^7$, $X^8$ and $X^9$ include groups having at least one atom selected from the group consisting of oxygen atoms, nitrogen atoms and silicon atoms.

Examples of substituted hydrocarbyl groups with oxygen atoms include alkoxyalkyl groups such as methoxymethyl, methoxyethyl, ethoxymethyl and ethoxyethyl groups.

Examples of substituted hydrocarbyl groups with nitrogen atoms include dialkylaminoalkyl groups such as dimethylaminomethyl, dimethylaminoethyl, diethylaminomethyl and diethylaminoethyl groups.

Examples of substituted hydrocarbyl groups with silicon atoms include trialkylsilylalkyl groups such as trimethylsilylmethyl, trimethylsilylethyl, triethylsilylmethyl and triethylsilylethyl groups.

The number of carbon atoms of an optionally substituted hydrocarbyl group is preferably 1 to 10 and more preferably 1 to 4. An optionally substituted hydrocarbyl group is preferably an alkyl group or an alkoxyalkyl group. More preferred as alkyl groups are alkyl groups of 1 to 4 carbon atoms, with methyl and ethyl groups being especially preferred. Alkoxyalkyl groups are preferably alkoxyalkyl groups of 2 to 4 carbon atoms.

Examples of substituted amino groups for $X^7$, $X^8$ and $X^9$ include groups represented by formula (7-X) and groups represented by formula (7-Y).

[Chemical Formula 15]

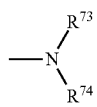

(7-X)

In formula (7-X), $R^{73}$ and $R^{74}$ each independently represent a hydrocarbyl group or a trihydrocarbylsilyl group, or a hydrocarbylene group formed by bonding between a portion of $R^{73}$ and a portion of $R^{74}$, and optionally having a nitrogen atom and/or oxygen atom.

[Chemical Formula 16]

(7-Y)

In formula (7-Y), $R^{75}$ represents a hydrocarbylidene group. Incidentally, $R^{75}$ is a group corresponding to formula (7-X) wherein $R^{73}$ and $R^{74}$ are a single group and are bonded to a nitrogen atom by a double bond.

Examples of hydrocarbyl groups for $R^{73}$ and $R^{74}$ include alkyl, alkenyl, alkynyl, aryl and aralkyl groups. Preferred alkyl groups are alkyl groups of 1 to 12 carbon atoms, examples of which include methyl, ethyl, n-propyl, isopropyl, n-butyl, sec-butyl and tert-butyl groups. Preferred alkenyl groups are alkenyl groups of 2 to 12 carbon atoms, with examples including vinyl, allyl, 1-propenyl and isopropenyl groups. Preferred alkynyl groups are alkynyl groups of 2 to 12 carbon atoms, examples of which include ethynyl and 2-propynyl groups. Preferred aryl groups are aryl groups of 6 to 12 carbon atoms, examples of which include phenyl, tolyl and xylyl groups. Preferred aralkyl groups are aralkyl groups of 7 to 13 carbon atoms, with an example being benzyl group.

The number of carbon atoms of a hydrocarbyl group is preferably 1 to 10, more preferably 1 to 4 and even more preferably 1 to 2. The hydrocarbyl groups are preferably alkyl groups, and more preferably straight-chain alkyl groups.

Examples of trihydrocarbylsilyl groups for $R^{73}$ and $R^{74}$ include trialkylsilyl groups of 3 to 12 carbon atoms such as trimethylsilyl, triethylsilyl, triisopropylsilyl and tert-butyldimethylsilyl groups.

A trihydrocarbylsilyl group is preferably a trialkylsilyl group of 3 to 9 carbon atoms, more preferably a trialkylsilyl group wherein the alkyl group bonded to the silicon atom is an alkyl group of 1 to 3 carbon atoms, and even more preferably a trimethylsilyl group.

Examples of hydrocarbylene groups wherein a portion of $R^{73}$ and a portion of $R^{74}$ are bonded, and optionally having a nitrogen atom and/or oxygen atom, include hydrocarbylene, nitrogen atom-containing hydrocarbylene and oxygen atom-containing hydrocarbylene groups.

Examples of hydrocarbylene groups include alkylene groups such as ethylene, trimethylene, tetramethylene, pentamethylene and hexamethylene groups.

Examples of nitrogen atom-containing hydrocarbylene groups include the group represented by —CH$_2$CH$_2$—NH—CH$_2$—, the group represented by —CH$_2$CH$_2$—N=CH—, the group represented by —CH=CH—N=CH— and the group represented by —CH$_2$CH$_2$NH—CH$_2$CH$_2$—.

Examples of oxygen atom-containing hydrocarbylene groups include the group represented by —CH$_2$CH$_2$—O—CH$_2$CH$_2$—.

The number of carbon atoms of a hydrocarbylene group optionally having a nitrogen atom and/or oxygen atom is preferably 2 to 20, more preferably 2 to 7 and even more preferably 4 to 6.

A hydrocarbylene group optionally having a nitrogen atom and/or oxygen atom is preferably a hydrocarbylene group, more preferably an alkylene group and even more preferably a polymethylene group.

Preferably, $R^{73}$ and $R^{74}$ are each independently an alkyl or trialkylsilyl group or an alkylene group in which a portion of $R^{73}$ and a portion of $R^{74}$ are bonded, and more preferably they are each independently an alkyl group.

Groups represented by formula (7-X) include acyclic amino groups and cycloamino groups.

Among acyclic amino groups, examples of groups of formula (7-X) wherein $R^{73}$ and $R^{74}$ are hydrocarbyl groups include dialkylamino groups such as dimethylamino, diethylamino, di(n-propyl)amino, di(isopropyl)amino, di(n-butyl)amino, di(sec-butyl)amino, di(tert-butyl)amino and ethylmethylamino groups.

Among acyclic amino groups, examples of groups of formula (7-X) wherein $R^{73}$ and $R^{74}$ are trihydrocarbylsilyl groups include bis(trialkylsilyl)amino groups such as bis(trimethylsilyl)amino and bis(tert-butyl-dimethylsilyl)amino groups.

Among cycloamino groups, examples of groups of formula (7-X) wherein the group in which a portion of $R^{73}$ and a portion of $R^{74}$ are bonded is a hydrocarbylene group, include 1-aziridinyl, 1-azetidinyl, 1-pyrrolidinyl, 1-hexamethyleneimino and 1-pyrrolyl groups.

Among cycloamino groups, examples of groups of formula (7-X) wherein the group in which a portion of $R^{73}$ and a portion of $R^{74}$ are bonded is a nitrogen atom-containing hydrocarbylene group, include 1-imidazolyl, 4,5-dihydro-1-imidazolyl, 1-imidazolidinyl and 1-piperazinyl groups.

Among cycloamino groups, groups of formula (7-X) wherein the group in which a portion of $R^{73}$ and a portion of $R^{74}$ are bonded is an oxygen atom-containing hydrocarbylene group, include morpholino group.

Examples of hydrocarbylidene groups for $R^{75}$ include ethylidene, propylidene, butylidene, 1-methylethylidene, 1-methylpropylidene and 1,3-dimethylbutylidene groups. The number of carbon atoms of a hydrocarbylidene group is preferably 2 to 20 and more preferably 2 to 6.

Examples of groups represented by formula (7-Y) include acyclic amino groups such as ethylideneamino, 1-methylpropylideneamino, 1,3-dimethylbutylideneamino, 1-methylethylideneamino and 4-N,N-dimethylaminobenzylideneamino groups.

In formula (7), the substituted amino groups for $X^7$, $X^8$ and $X^9$ are preferably acyclic amino groups, more preferably dialkylamino groups, even more preferably dimethylamino, diethylamino, di(n-propyl)amino or di(n-butyl)amino groups, and most preferably dimethylamino or diethylamino groups.

In formula (7), at least one of $X^7$, $X^8$ and $X^9$ is a substituted amino group, preferably two or more of $X^7$, $X^8$ and $X^9$ are substituted amino groups, and more preferably two of $X^7$, $X^8$ and $X^9$ are substituted amino groups.

Among compounds represented by formula (7), compounds wherein $R^{71}$ is hydrogen and one of $X^7$, $X^8$ and $X^9$ is a dialkylamino group include the following compounds.

Examples of compounds wherein s in formula (7) is 0 include (dimethylamino)dimethylvinylsilane, (diethylamino)dimethylvinylsilane, (dipropylamino)dimethylvinylsilane, (dibutylamino)dimethylvinylsilane, (dimethylamino)diethylvinylsilane, (diethylamino)diethylvinylsilane, (dipropylamino)diethylvinylsilane and (dibutylamino)diethylvinylsilane.

Examples of compounds wherein s in formula (7) is 1 include (dimethylamino)dimethyl(4-vinylphenyl)silane, (dimethylamino)dimethyl(3-vinylphenyl)silane, (diethylamino)dimethyl(t-vinylphenyl)silane, (diethylamino)dimethyl(3-vinylphenyl)silane, (dipropylamino)dimethyl(4-vinylphenyl)silane, (dipropylamino)dimethyl(3-vinylphenyl)silane, (dibutylamino)dimethyl(4-vinylphenyl)silane, (dibutylamino)dimethyl(3-vinylphenyl)silane, (dimethylamino)diethyl(4-vinylphenyl)silane, (dimethylamino)diethyl(3-vinylphenyl)silane, (diethylamino)diethyl(4-vinylphenyl)silane, (diethylamino)diethyl(3-vinylphenyl)silane, (dipropylamino)diethyl(4-vinylphenyl)silane, (dipropylamino)diethyl(3-vinylphenyl)silane, (dibutylamino)diethyl(4-vinylphenyl)silane and (dibutylamino)diethyl(3-vinyl)phenyl)silane.

Among compounds represented by formula (7), compounds wherein $R^{71}$ is hydrogen and two of $X^7$, $X^8$ and $X^9$ are dialkylamino groups include the following compounds.

Examples of compounds wherein s in formula (7) is 0 include bis(dimethylamino)methylvinylsilane, bis(diethylamino)methylvinylsilane, bis(dipropylamino)methylvinylsilane, bis(dibutylamino)methylvinylsilane, bis(dimethylamino)ethylvinylsilane, bis(diethylamino)ethylvinylsilane, bis(dipropylamino)ethylvinylsilane and bis(dibutylamino)ethylvinylsilane.

Examples of compounds wherein s in formula (7) is 1 include bis(dimethylamino)methyl(4-vinylphenyl)silane, bis(dimethylamino)methyl(3-vinylphenyl)silane, bis(diethylamino)methyl(4-vinylphenyl)silane, bis(diethylamino)methyl(3-vinylphenyl)silane, bis(dipropylamino)methyl(4-vinylphenyl)silane, bis(dipropylamino)methyl(3-vinylphenyl)silane, bis(dibutylamino)methyl(4-vinylphenyl)silane, bis(dibutylamino)methyl(3-vinylphenyl)silane, bis(dimethylamino)ethyl(4-vinylphenyl)silane, bis(dimethylamino)ethyl(3-vinylphenyl)silane, bis(diethylamino)ethyl(4-vinylphenyl)silane, bis(diethylamino)ethyl(3-vinylphenyl)silane, bis(dipropylamino)ethyl(4-vinylphenyl)silane, bis(dipropylamino)ethyl(3-vinylphenyl)silane, bis(dibutylamino)ethyl(4-vinylphenyl)silane and bis(dibutylamino)ethyl(3-vinylphenyl)silane.

Among compounds represented by formula (7), compounds wherein $R^{71}$ is a methyl group and two of $X^7$, $X^8$ and $X^9$ are dialkylamino groups include the following compounds.

Examples of compounds wherein s in formula (7) is 1 include bis(dimethylamino)methyl(4-isopropenylphenyl)silane, bis(dimethylamino)methyl(3-isopropenylphenyl)silane, bis(diethylamino)methyl(4-isopropenylphenyl)silane, bis(diethylamino)methyl(3-isopropenylphenyl)silane, bis(dipropylamino)methyl(4-isopropenylphenyl)silane, bis(dipropylamino)methyl(3-isopropenylphenyl)silane, bis(dibutylamino)methyl(4-isopropenylphenyl)silane, bis(dibutylamino)methyl(3-isopropenylphenyl)silane, bis(dimethylamino)ethyl(4-isopropenylphenyl)silane, bis(dimethylamino)ethyl(3-isopropenylphenyl)silane, bis(diethylamino)ethyl(4-isopropenylphenyl)silane, bis(diethylamino)ethyl(3-isopropenylphenyl)silane, bis(dipropyl amino)ethyl(4-isopropenylphenyl)silane, bis(dipropylamino)ethyl(3-isopropenylphenyl)silane, bis(dibutylamino)ethyl(4-isopropenylphenyl)silane and bis(dibutylamino)ethyl(3-isopropenylphenyl)silane.

Among compounds represented by formula (7), compounds wherein $R^{71}$ is a vinyl group and two of $X^7$, $X^8$ and $X^9$ are dialkylamino groups include the following compounds.

Examples of compounds wherein s in formula (7) is 0 include bis(dimethylamino)methyl(1-methylene-2-propenyl)silane, bis(diethylamino)methyl(1-methylene-2-propenyl)silane, bis(dipropylamino)methyl(1-methylene-2-propenyl)silane, bis(dibutylamino)methyl(1-methylene-2-propenyl)silane, bis(dimethylamino)ethyl(1-methylene-2-propenyl)silane, bis(diethylamino)ethyl(ethylene-2-propenyl)silane, bis(dipropylamino)ethyl(1-methylene-2-propenyl)silane and bis(dibutylamino)ethyl(1-methylene-2-propenyl)silane.

Among compounds represented by formula (7), compounds wherein $R^{71}$ is a phenyl group and two of $X^7$, $X^8$ and $X^9$ are dialkylamino groups include the following compounds.

Examples of compounds wherein s in formula (7) is 1 include 1-{4-[bis(dimethylamino)methylsilyl]phenyl}-1-phenylethylene, 1-{4-[bis(diethylamino)methylsilyl]phenyl}-1-phenylethylene, 1-{4-[bis(dipropylamino)methylsilyl]phenyl}-1-phenylethylene, 1-{4-[bis(dibutylamino)methylsilyl]phenyl}-1-phenylethylene, 1-{4-[bis(dimethylamino)ethylsilyl]phenyl}-1-phenylethylene, 1-{4-[bis(diethylamino)ethylsilyl]phenyl}-1-phenylethylene, 1-{4-[bis(dipropylamino)ethylsilyl]phenyl}-1-phenylethylene and 1-{4-[bis(dibutylamino)ethylsilyl]phenyl}-1-phenylethylene.

Among compounds represented by formula (7), compounds wherein $R^{71}$ is hydrogen and all three of $X^7$, $X^8$ and $X^9$ are dialkylamino groups include the following compounds.

Examples of compounds wherein s in formula (7) is 0 include tris(dimethylamino)vinylsilane, tris(diethylamino)vinylsilane, tris(dipropylamino)vinylsilane and tris(dibutylamino)vinylsilane.

Examples of compounds wherein s in formula (7) is 1 include tris(dimethylamino) (4-vinylphenyl)silane, tris(dimethylamino) (3-vinylphenyl)silane, tris(diethylamino) (4-vinylphenyl)silane, tris(diethylamino) (3-vinylphenyl)silane, tris(dipropylamino) (4-vinylphenyl)silane, tris(dipropylamino) (3-vinylphenyl)silane, tris(dibutylamino) (4-vinylphenyl)silane and tris(dibutylamino) (3-vinylphenyl)silane.

Among compounds represented by formula (7), compounds wherein $R^{71}$ is a methyl group and all three of $X^7$, $X^8$ and $X^9$ are dialkylamino groups include the following compounds.

Examples of compounds wherein s in formula (7) is 1 include tris(dimethylamino) (4-isopropenylphenyl)silane, tris(dimethylamino) (3-isopropenylphenyl)silane, tris(diethylamino) (4-isopropenylphenyl)silane, tris(diethylamino) (3-isopropenylphenyl)silane, tris(dipropylamino) (4-isopropenylphenyl)silane, tris(dipropylamino) (3-isopropenylphenyl)silane, tris(dibutylamino) (4-isopropenylphenyl)silane and tris(dibutylamino (3-isopropenylphenyl)silane.

Among compounds represented by formula (7), compounds wherein $R^{71}$ is a vinyl group and all three of $X^7$, $X^8$ and $X^9$ are dialkylamino groups include the following compounds.

Examples of compounds wherein s in formula (7) is 0 include tris(dimethylamino) (1-methylene-2-propenyl)silane, tris(diethylamino) (1-methylene-2-propenyl)silane, tris(dipropylamino) (1-methylene-2-propenyl)silane and tris(dibutylamino) (1-methylene-2-propenyl)silane.

Among compounds represented by formula (7), compounds wherein $R^{71}$ is a phenyl group and all three of $X^7$, $X^8$ and $X^9$ are dialkylamino groups include the following compounds.

Examples of compounds wherein s in formula (7) is 1 include 1-[4-tris(dimethylamino)silylphenyl]-1-phenylethylene, 1-[4-tris(diethylamino)silylphenyl]-1-phenylethylene, 1-[4-tris(di-n-propylamino)methylsilylphenyl]-1-phenylethylene and 1-[4-tris(di-n-butylamino)methylsilylphenyl]-1-phenylethylene.

Preferred compounds as groups represented by formula (are compounds wherein two of $X^7$, $X^8$ and $X^9$ in formula (7) are dialkylamino groups, and more preferably compounds wherein two of $X^7$, $X^8$ and $X^9$ in formula (7) are dialkylamino groups, $R^{71}$ is a hydrogen atom and s is 0.

Most preferred as compounds represented by formula (7) are bis(dimethylamino)methylvinylsilane, bis(diethylamino)methylvinylsilane, bis(dipropylamino)methylvinylsilane, bis(dibutylamino)methylvinylsilane, bis(dimethylamino)ethylvinylsilane, bis(diethylamino)ethylvinylsilane, bis(dipropylamino)ethylvinylsilane and bis(dibutylamino)ethylvinylsilane.

The modifying agent may include a nitrogen atom- and carbonyl group-containing compound represented by the following formula (8).

[Chemical Formula 17]

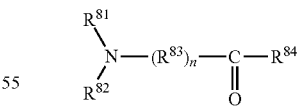

(8)

$R^{81}$ and $R^{82}$ in formula (8) each independently represent an optionally substituted hydrocarbyl group, or they represent a hydrocarbylene group wherein a portion of $R^{81}$ and a portion of $R^{82}$ are bonded, optionally having a nitrogen atom and/or oxygen atom, or $R^{84}$ represents an optionally substituted hydrocarbyl group or a hydrogen atom, or a portion of either $R^{81}$ or $R^{82}$ and a portion of $R^{84}$ are bonded together to form a hydrocarbylene group, which optionally has a nitrogen atom and/or oxygen atom. $R^{83}$ represents a divalent group, and n is 0 or 1.

An optionally substituted hydrocarbyl group for $R^{81}$, $R^{82}$ and $R^{84}$ is a hydrocarbyl group, or a substituted hydrocarbyl group. Examples of substituted hydrocarbyl groups include hydrocarbyl groups substituted with hydrocarbyloxy groups, and hydrocarbyl groups substituted with substituted amino groups.

Examples of hydrocarbyl groups include alkyl, alkenyl, alkynyl, aryl and aralkyl groups. Preferred alkyl groups are alkyl groups of 1 to 12 carbon atoms, examples of which include methyl, ethyl, n-propyl, isopropyl, n-butyl, sec-butyl, tert-butyl, n-pentyl, n-hexyl, n-octyl, n-dodecyl, cyclopentyl and cycle hexyl groups. Preferred alkenyl groups are alkenyl groups of 2 to 12 carbon atoms, with examples including vinyl, allyl, 1-propenyl and isopropenyl groups. Preferred alkynyl groups are alkynyl groups of 2 to 12 carbon atoms, examples of which include ethynyl and 2-propynyl groups. Preferred aryl groups are aryl groups of 6 to 12 carbon atoms, with examples including phenyl, methylphenyl, ethylphenyl, benzyl, tolyl and xylyl groups. Preferred aralkyl groups are aralkyl groups of 7 to 13 carbon atoms, with an example being benzyl group.

Examples of hydrocarbyl groups substituted with hydrocarbyloxy groups include alkoxyalkyl groups such as methoxymethyl, ethoxymethyl and ethoxyethyl groups.

Examples of hydrocarbyl groups substituted with a substituted amino group include (N,N-dialkylamino)alkyl groups such as N,N-dimethylaminomethyl, 2-(N,N-dimethylamino)ethyl, 2-(N,N-diethylamino)ethyl, 3-(N,N-dimethylamino)propyl and 3-(N,N-diethylamino)propyl groups; (N,N-dialkylamino)aryl groups such as 4-(N,N-dimethylamino)phenyl, 3-(N,N-dimethylamino)phenyl, 4-(N,N-diethylamino)phenyl and 3-(N,N-diethylamino)phenyl groups; (N,N-dialkylamino)alkylaryl groups such as 4-(N,N-dimethylamino)methylphenyl and 4-[2-(N,N-dimethylamino)ethyl]phenyl groups; cycloamino group-substituted alkyl groups such as 3-(1-pyrrolidinyl)propyl, 3-(1-piperidinyl)propyl and 3-(1-imidazolyl)propyl groups; cycloamino group-substituted aryl groups such as 4-(1-pyrrolidinyl)phenyl, 4-(1-piperidinyl)phenyl and 4-(1-imidazolyl)phenyl groups; and cycloamino group-substituted alkylaryl groups such as 4-[2-(1-pyrrolidinyl)ethyl]phenyl, 4-[2-(1-piperidinyl)ethyl]phenyl and 4-[2-(1-imidazolyl)ethyl]phenyl groups.

A hydrocarbylene group that is a group formed having a portion of $R^{81}$ bonded with a portion of $R^{82}$ or a group formed having a portion of $R^{81}$ or $R^{82}$ bonded with a portion of $R^{84}$, and optionally having a nitrogen atom and/or oxygen atom, is a hydrocarbylene group or a hydrocarbylene group with a nitrogen atom and/or oxygen atom.

Examples of hydrocarbylene groups include alkylene groups such as trimethylene, tetramethylene, pentamethylene, hexamethylene and 2,2,4-trimethylhexane-1,6-diyl; and arylene groups such as 1,4-phenylene. Examples of hydrocarbylene groups optionally having nitrogen atoms and/or oxygen atoms include the group represented by —CH=N—CH=CH—, the group represented by —CH=N—CH$_2$—CH$_2$— and groups represented by —(CH$_2$)$_t$—O—(CH$_2$)$_u$— (where t and u are each an integer of 1 or greater).

Examples of divalent groups for $R^{83}$ include hydrocarbylene groups, hydrocarbylene groups with a nitrogen atom and/or oxygen atom, groups formed by bonding of a hydrocarbylene group with an oxygen atom, and groups formed by bonding of a hydrocarbylene group with a group represented by —NR$^{85}$— (where R$^{85}$ represents a hydrocarbyl group or a hydrogen atom).

Examples of hydrocarbylene groups include groups formed by bonding of an alkylene, alkenediyl, arylene or arylene group with an alkylene group (hereunder also referred to as "arylene-alkylene group"). Examples of alkylene groups include methylene, ethylene, propylene, tetramethylene, pentamethylene, hexamethylene, heptamethylene, octamethylene and 2,2,4-trimethylhexane-1,6-diyl groups. Examples of alkenediyl groups include pentane-2-ene-1,5-diyl groups. Examples of arylene groups include phenylene, naphthylene and biphenylene groups. Examples of arylene-alkylene groups include phenylene-alkylene, naphthylene-alkylene and biphenylene-alkylene groups.

Examples of hydrocarbylene groups with a nitrogen atom and/or oxygen atom include the group represented by —CH=N—CH=CH—, the group represented by —CH=N—CH$_2$—CH$_2$—, and groups represented by —(CH$_2$)$_t$—O—(CH$_2$)— (where t and u are each an integer of 1 or greater). Examples of groups formed by bonding of a hydrocarbylene group with an oxygen atom include groups represented by —(CH$_2$)$_n$—O— (where u is an integer of 1 or greater).

Examples of groups formed by bonding of a hydrocarbylene group with a group represented by —NR$^{85}$— (where R$^{85}$ represents a hydrocarbyl group or a hydrogen atom), include groups represented by —(CH$_2$)v-NR— (where R represents a hydrocarbyl group of 1 to 10 carbon atoms or a hydrogen atom, and v is an integer of 1 or greater).

Preferred compounds represented by formula (8) are compounds wherein n is 0 and $R^{84}$ represents an optionally substituted hydrocarbyl group or a hydrogen atom, i.e. compounds represented by the following formula (8-1); compounds wherein n is 0 and that represent a hydrocarbylene group wherein a portion of $R^{81}$ and a portion of $R^{84}$ are bonded, or a group formed by bonding of a hydrocarbylene group with a group represented by —NR$^{85}$— (where R$^{85}$ represents a hydrocarbyl group or a hydrogen atom), i.e. compounds represented by the following formula (8-2); compounds wherein n is 1 and $R^{83}$ represents a hydrocarbylene group, i.e. compounds represented by the following formula (8-3); and compounds wherein n is 1 and $R^{83}$ represents a group formed by bonding of a hydrocarbylene group with an oxygen atom or a group formed by bonding of a hydrocarbylene group with a group represented by —NR$^{85}$— (where R$^{85}$ represents a hydrocarbyl group or a hydrogen atoms), i.e. compounds represented by the following formula

[Chemical Formula 18]

(8-1)

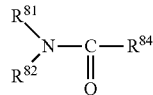

In formula (8-1), $R^{81}$, $R^{82}$ and $R^{84}$ have the same definitions as $R^{81}$, $R^{82}$ and $R^{84}$ in formula (8).

[Chemical Formula 19]

(8-2)

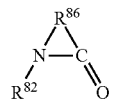

In formula (8-2), $R^{82}$ has the same definition as $R^{82}$ in formula (8). $R^{86}$ represents a hydrocarbylene group, or a group formed by bonding of a hydrocarbylene group with a group represented by —$NR^{85}$— (where $R^{85}$ represents a hydrocarbyl group or a hydrogen atom).

[Chemical Formula 20]

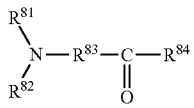

(8-3)

In formula (8-3), $R^{81}$, $R^{82}$ and $R^{84}$ have the same definitions as $R^{81}$, $R^{82}$ and $R^{84}$ in formula (8). $R^{83}$ represents a hydrocarbylene

[Chemical Formula 21]

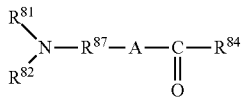

(8-4)

In formula (8-4), $R^{81}$, $R^{82}$ and $R^{84}$ have the same definitions as $R^{81}$, $R^{82}$ and $R^{84}$ in formula (8). $R^{87}$ represents a hydrocarbylene group, and A represents an oxygen atom or —$NR^{85}$— (where $R^{85}$ represents a hydrocarbyl group or a hydrogen atom).

$R^{81}$ and $R^{82}$ in formula (8-1) preferably each independently represent a hydrocarbyl group of 1 to 10 carbon atoms, or represent a hydrocarbylene of 3 to 10 carbon atoms, or a nitrogen atom-containing hydrocarbylene group of 3 to 10 carbon atoms, formed by bonding of a portion of $R^{81}$ and a portion of $R^{82}$, more preferably each independently represent an alkyl group of 1 to 10 carbon atoms or an aryl group of 6 to 10 carbon atoms, or an alkylene group of 3 to 10 carbon atoms, formed by bonding of a portion of $R^{81}$ and a portion of $R^{82}$, or the group represented by —CH=N—CH—CH—, or the group represented by CH=N—CH$_2$—CH$_2$, even more preferably each independently represent an alkyl group of 1 to 6 carbon atoms, and yet more preferably each independently represent a methyl group or an ethyl group.

$R^{84}$ in formula (8-1) preferably represents a hydrocarbyl group or a hydrogen atom, more preferably it represents a hydrocarbyl group of 1 to 10 carbon atoms or a hydrogen atom, even more preferably it represents an alkyl group of 1 to 6 carbon atoms or a hydrogen atom, and yet more preferably it represents a hydrogen atom, a methyl group or an ethyl group.

Among compounds represented by formula (8-1), examples of compounds wherein $R^{84}$ represents a hydrocarbyl group include N,N-dihydrocarbyl acetamides such as N,N-dimethylacetamide, N,N-diethylacetamide and N-methyl-N-ethyl acetamide; N,N-dihydrocarbylacrylamides such as N-dimethylacrylamide, N,N-diethylacrylamide and N-methyl-N-ethylacrylamide; and N,N-dihydrocarbylmethacrylamides such as N,N-dimethylmethacrylamide, N,N-diethylmethacrylamide and N-methyl-N-ethylmethacrylamide.

Among compounds represented by formula (8-1), examples of compounds wherein $R^{84}$ represents a hydrogen atom include N,N-dihydrocarbylformamides such as N,N-dimethylformamide, N,N-diethylformamide and N-methyl-N-ethylformamide.

Examples of hydrocarbylene groups for $R^{86}$ in formula (8-2) include groups formed by bonding of an alkylene, alkenediyl, arylene or arylene group with an alkylene group (hereunder also referred to as "arylene-alkylene group"). Preferred alkylene groups are alkylene groups of 1 to 12 carbon atoms, examples of which include methylene, ethylene, propylene, tetramethylene, pentamethylene, hexamethylene, heptamethylene, octamethylene and 2,2,4-trimethylhexane-1,6-diyl groups. Preferred alkenediyl groups are alkenediyl groups of 4 to 12 carbon atoms, examples of which include pentane-2-ene-1,5-diyl groups, and preferred arylene groups are arylene groups of 6 to 12 carbon atoms, examples of which include phenylene, naphthylene and biphenylene groups. Examples of arylene-alkene groups include phenylene-alkylene, naphthylene-alkylene and biphenylene-alkylene groups. Examples of groups formed by bonding of a hydrocarbylene group with a group represented by —$NR^{85}$— (where $R^{85}$ represents a hydrocarbyl group or a hydrogen atom), for $R^{86}$, include groups represented by —(CH$_2$)$_v$—NR— (where R represents a hydrocarbyl group of 1 to 10 carbon atoms or a hydrogen atom, and v is an integer of 1 or greater).

$R^{82}$ in formula (8-2) preferably represents a hydrocarbyl group of 1 to 10 carbon atoms, more preferably it represents an alkyl group of 1 to 10 carbon atoms or an aryl group of 6 to 10 carbon atoms, even more preferably it represents an alkyl group of 1 to 6 carbon atoms or a phenyl group, and yet more preferably it represents a methyl, ethyl or phenyl group.

$R^{86}$ in formula (8-2) preferably represents a hydrocarbylene group of 1 to 10 carbon atoms, or a group formed by bonding of a hydrocarbylene group of 1 to 10 carbon atoms with a group represented by —$NR^{88}$— (where $R^{88}$ represents a hydrocarbyl group of 1 to 10 carbon atoms or a hydrogen atom), more preferably it represents an alkylene group of 3 to 6 carbon atoms or a group represented by —(CH$_2$)$_w$—NR— (where R represents a hydrocarbyl group of 1 to 10 carbon atoms, and w is an integer of 2 to 5), and even more preferably it represents trimethylene, tetramethylene, pentamethylene, or a group represented by —(CH$_2$)$_2$—N(CH$_3$)—.

Among compounds represented by formula (8-2), examples of compounds wherein $R^{86}$ represents a hydrocarbylene group include N-hydrocarbyl-β-propiolactams such as N-methyl-β-propiolactam and N-phenyl-β-propiolactam; N-hydrocarbyl-2-pyrrolidones such as N-methyl-2-pyrrolidone, N-vinyl-2-pyrrolidone, N-phenyl-2-pyrrolidone, N-tert-butyl-2-pyrrolidone and N-methyl-5-methyl-2-pyrrolidone; N-hydrocarbyl-2-piperidones such as N-methyl-2-piperidone, N-vinyl-2-piperidone and N-phenyl-2-piperidone; N-hydrocarbyl-ε-caprolactams such as N-methyl-ε-caprolactam and N-phenyl-ε-caprolactam; and N-hydrocarbyl-ω-laurylolactams such as N-methyl-ω-laurylolactam and N-vinyl-ω-laurylolactam. Among these, N-methyl-2-pyrrolidone, N-phenyl-2-pyrrolidone, N-methyl-ε-caprolactam and N-phenyl-ε-caprolactam are preferred, and N-phenyl-2-pyrrolidone and N-methyl-ε-caprolactam are more preferred.

Among compounds represented by formula (8-2), examples of compounds wherein $R^{86}$ is a group formed by bonding of a hydrocarbylene group with a group represented by —$NR^{85}$— (where $R^{85}$ is a hydrocarbyl group or a hydrogen atom), include 1,3-dihydrocarbyl-2-imidazolidinones such as 1,3-dimethyl-2-imidazolidinone, 1,3-diethyl-2-imidazolidinone, 1,3-divinyl-2-imidazolidinone and 1-methyl-3-ethyl-2-imidazolidinone. Among these, 1,3-dimethyl-2-imidazolidinone and 1,3-diethyl-2-imidazolidinone are preferred, and 1,3-dimethyl-2-imidazolidinone is more preferred.

$R^{83}$ in formula (8-3) preferably represents a hydrocarbylene group of 1 to 10 carbon atoms, more preferably it represents an alkylene group of 1 to 10 carbon atoms or an arylene group of 6 to 10 carbon atoms, even more preferably it represents an alkylene group of 1 to 6 carbon atoms or a phenylene group, and yet more preferably it represents an ethylene, trimethylene or 1,4-phenylene group.

$R^{84}$ in formula (8-3) preferably represents a hydrocarbyl group of 1 to 10 carbon atoms, or a hydrocarbyl group of 3 to 10 carbon atoms substituted with a dialkylamino group, more preferably it represents an alkyl group of 1 to 6 carbon atoms, an aryl group of 6 to 10 carbon atoms, a dialkylaminoalkyl group of 3 to 6 carbon atoms or a dialkylaminoaryl group of 8 to 10 carbon atoms, and even more preferably it represents a methyl group, an ethyl group, a dialkylaminomethyl group of 3 to 6 carbon atoms, a dialkylaminoethyl group of 4 to 6 carbon atoms, a phenyl group or a dialkylaminophenyl group of 8 to 10 carbon atoms.

$R^{81}$ and $R^{82}$ in formula each independently represent a hydrocarbyl group of 1 to 10 carbon atoms, or represent a hydrocarbylene of 3 to 10 carbon atoms or a hydrocarbylene group of 3 to 10 carbon atoms with a nitrogen atom, wherein a portion of $R^{81}$ and a portion of $R^{82}$ are bonded, more preferably each independently represent an alkyl of 1 to 10 carbon atoms or an aryl group of 6 to 10 carbon atoms, or $R^{81}$ is bonded to $R^{82}$, and the group with $R^{81}$ bonded to $R^{82}$ represents an alkylene group of 3 to 10 carbon atoms, the group represented by —CH=N—CH=CH—, the group represented by —CH=N—CH$_2$—CH$_2$— or the group represented by —(CH$_2$)$_2$—O—(CH$_2$)$_2$—, even more preferably each independently represent an alkyl group of 1 to 6 carbon atoms, or an alkylene group of 3 to 6 carbon atoms, the group —CH=N—CH=CH— or the group —CH=N—CH$_2$—CH$_2$—, formed by bonding of a portion of $R^{81}$ and a portion of $R^{82}$, and yet more preferably each independently represent a methyl or ethyl group, or a tetramethylene or hexamethylene group or the group formed by bonding of a portion of $R^{81}$ and a portion of $R^{82}$.

Among compounds represented by formula (8-3), examples of compounds wherein $R^{83}$ represents an arylene group and $R^{84}$ represents an alkyl group include 4-(N,N-dihydrocarbylamino)acetophenones such as 4-(N,N-dimethylamino)acetophenone, 4-(N-methyl-N-ethylamino)acetophenone and 4-(N,N-diethylamino)acetophenone; and 4-cyclic aminoacetophenone compounds such as 4'-(imidazol-1-yl)acetophenone. Of these, 4-cyclic aminoacetophenone compounds are preferred, and 4'-(imidazol-1-yl)acetophenone is more preferred.

Among compounds represented by formula (8-3), examples of compounds wherein $R^{83}$ represents a hydrocarbylene group and $R^{84}$ represents a hydrocarbyl or substituted hydrocarbyl group include bis(dihydrocarbylaminoalkyl)ketones such as 1,7-bis(methylethylamino)-4-heptanone and 1,3-bis(diphenylamine)-2-propanone. Examples of compounds wherein $R^{83}$ represents an arylene group and $R^{84}$ represents an aryl or substituted aryl group include 4-(dihydrocarbylamino)benzophenones such as 4-N,N-dimethylaminobenzophenone, 4-N,N-diethylaminobenzophenone, 4-N,N-di-t-butylaminoberizophenone and 4-N,N-diphenylaminobenzophenone; and 4,4'-bis(dihydrocarbylamino) benzophenones such as 4,4'-bis(dimethylamino)benzophenone, 4,4'-bis(diethylamino)benzophenone and 4,4'-bis(diphenylamino)benzophenone. Of these, 1,7-bis(methylethylamino)-4-heptanone 4-N,N-dimethylaminobenzophenone, 4-N,N-diethylaminobenzophenone, 4,4'-bis(dimethylamino)benzophenone and 4,4'-bis(diethylamino)benzophenone are preferred, and 4-N,N-dimethylaminobenzophenone, 4-N,N-diethylaminobenzophenone, 4,4'-bis(dimethylamino)benzophenone and 4,4'-bis(diethylamino)benzophenone are more preferred.

In formula (8-4), the oxygen atom or —NR$^{85}$— (where $R^{85}$ represents a hydrocarbyl group or a hydrogen atom) as A is preferably an oxygen atom or a group represented by —NR— (where R represents a hydrocarbylene of 1 to 5 carbon atoms or a hydrogen atom), more preferably an oxygen atom or a group represented by —NH—, and even more preferably a group represented by —NH—.

Examples of hydrocarbylene groups for $R^{87}$ in formula (8-4) include groups formed by bonding of an alkylene, alkenediyl, arylene or arylene group with an alkylene group (hereunder also referred to as "arylene-alkylene group"). Preferred alkylene groups are alkylene groups of 1 to 12 carbon atoms, examples of which include methylene, ethylene, propylene, tetramethylene, pentamethylene, hexamethylene, heptamethylene, octamethylene and 2,2,4-trimethylhexane-1,6-diyl groups. Examples of alkenediyl groups include alkenediyl groups of 4 to 12 carbon atoms, an example of which is pentane-2-ene-1,5-diyl group. Examples of arylene groups include arylene groups of 6 to 12 carbon atoms, examples of which include phenylene, naphthylene and biphenylene groups. Examples of arylene-alkylene groups include phenylene-alkylene, naphthylene-alkylene and biphenylene-alkylene groups.

$R^{84}$ in formula (8-4) preferably represents a hydrocarbyl group of 1 to 10 carbon atoms, more preferably it represents an alkenyl group of 2 to 5 carbon atoms, even more preferably it represents a vinyl or isopropenyl group, and yet more preferably it represents a vinyl group.

$R^{87}$ in formula (8-4) preferably represents a hydrocarbylene group of 1 to 10 carbon atoms, more preferably it represents an alkylene group of 1 to 6 carbon atoms, even more preferably it represents an ethylene or trimethylene group, and yet more preferably it represents a trimethylene group.

$R^{81}$ and $R^{82}$ in formula (8-4) each independently represent a hydrocarbyl group of 1 to 10 carbon atoms, or represent a hydrocarbylene of 3 to 10 carbon atoms or a hydrocarbylene group of 3 to 10 carbon atoms with a nitrogen atom, wherein a portion of $R^{81}$ and a portion of $R^{82}$ are bonded, more preferably each independently represent an alkyl of 1 to 10 carbon atoms or an aryl group of 6 to 10 carbon atoms, or represent an alkylene group of 3 to 10 carbon atoms, the group represented by —CH=N—CH=CH—, the group represented by —CH=N—CH$_2$—CH$_2$— or the group represented by —(CH$_2$)$_2$—O—(CH$_2$)$_2$—, formed by bonding of a portion of $R^{81}$ and a portion of $R^{82}$, even more preferably each independently represent an alkyl group of 1 to 6 carbon atoms, or an alkylene group of 3 to 6 carbon atoms, the group —CH=N—CH=CH— or the group —CH=N—CH$_2$—CH$_2$—, formed by bonding of a portion of $R^{81}$ and a portion of $R^{82}$, and yet more preferably each independently represent a methyl or ethyl group, or a tetramethylene or hexamethylene group or the group —CH=N—CH=CH—, formed by bonding of a portion of $R^{81}$ and a portion of $R^{82}$.

Among compounds represented by formula (8-4), examples of compounds wherein A represents an oxygen atom include 2-(dihydrocarbylamino)ethyl acrylates such as 2-(dimethylamino)ethyl acrylate and 2-(diethylamino)ethyl acrylate; 3-(dihydrocarbyl amino)propyl acrylates such as 3-(dimethylamino)propyl acrylate; 2-(dihydrocarbylamino) ethyl methacrylates such as 2-(dimethylamino)ethyl methacrylate and 2-(diethylamino)ethyl methacrylate; and 3-(dihydrocarbylamino)propyl methacrylates such as 3-(dimethylamino)propyl methacrylate. Of these, 2-(dimethylamino)ethyl acrylate, 3-(dimethylamino)propyl acrylate, 2-(dimethylamino)ethyl methacrylate and 3-(dimethylamino)propyl methacrylate are preferred, and 2-(dimethylamino)ethyl acrylate and 3-(dimethylamino)propyl acrylate are more preferred.

Among compounds represented by formula (8-4), examples of compounds wherein A represents the group —NR$^{85}$— (where R$^3$ is a hydrocarbylene group or a hydrogen atom) include N-(2-dihydrocarbylaminoethyl)acrylamides such as N-(2-dimethylaminoethyl)acryl amide and N-(2-diethylaminoethyl)acrylamide; N-(3-dihydrocarbylaminopropyl)acrylamides such as N-(3-dimethylaminopropyl)acrylamide and N-(3-diethylaminopropyl)acrylamide; N-(4-dihydrocarbylaminobutyl)acrylamides such as N-(4-dimethylaminobutyl)acrylamide and N-(4-diethylaminobutyl)acrylamide; N-(2-dihydrocarbylaminoethyl)methacrylamides such as N-(2-dimethylaminoethyl) methacrylamide and N-(2-diethylaminoethyl) methacrylamide; N-(3-dihydrocarbylaminopropyl) methacrylamides such as N-(3-dimethylaminopropyl) methacrylamide and N-(3-diethylaminopropyl) methacrylamide; and N-(4-dihydrocarbylaminobutyl) methacrylamides such as N-(4-dimethylaminobutyl) methacrylamide and N-(4-diethylaminobutyl) methacrylamide. Of these, N-(2-dimethylaminoethyl) acrylamide, N-(3-dimethylaminopropyl)acrylamide and N-(4-dimethylaminobutyl)acrylamide are preferred, and N-(2-dimethylaminoethyl)acrylamide and N-(3-dimethylaminopropyl)acrylamide are more preferred.

(Organometallic Compound)

Organic alkali metal compounds, organic alkaline earth metal compounds and organic amphoteric metal compounds may be used, as examples of organometallic compounds to be reacted with the unit based on the modifying agent of the conjugated diene-based polymer. These organometallic compounds may be used in combinations of two or more, and the aforementioned adjusting agent may also be added as necessary, in order to increase reactivity of the organometallic compound.

An organic alkali metal compound used may be a compound selected from among the compounds mentioned as examples for the polymerization initiator. Examples of organic alkali metal compounds include organic lithium compounds, organic sodium compounds, organic potassium compounds and organic cesium compounds. The organic alkali metal compound is preferably an organic lithium compound, more preferably a lithium compound having a hydrocarbyl group of 1 to 20 carbon atoms, even more preferably a lithium compound having a hydrocarbyl group of 1 to 10 carbon atoms, and most preferably n-butyllithium, sec-butyllithium or tert-butyllithium.

Organic alkaline earth metal compounds include organic magnesium compounds, organic calcium compounds and organic strontium compounds. The organic alkaline earth metal compound is preferably an organic magnesium compound, more preferably a magnesium compound having a hydrocarbyl group of 1 to 20 carbon atoms, and even more preferably a magnesium compound having a hydrocarbyl group of 1 to 10 carbon atoms. Examples of organic alkaline earth metal compounds include methylmagnesium chloride, methylmagnesium bromide, ethylmagnesium chloride, ethylmagnesium bromide, n-propylmagnesium chloride, n-propylmagnesium bromide, isopropylmagnesium chloride, isopropylmagnesium bromide, n-butylmagnesium chloride, n-butylmagnesium bromide, sec-butylmagnesium chloride, sec-butyl magnesium bromide, tart-butylmagnesium chloride, tort-butylmagnesium bromide, allylmagnesium chloride, allylmagnesium bromide, vinylmagnesium bromide, phenylmagnesium chloride, phenylmagnesium bromide, benzylmagnesium chloride and benzylmagnesium bromide.

Organic amphoteric metal compounds include organic zinc compounds and organic aluminum compounds. The organic amphoteric metal compound is preferably an organic zinc compound or organic aluminum compound having a hydrocarbyl group of 1 to 20 carbon atoms. Examples of organic zinc compounds include hydrocarbyl zinc halides such as methyl zinc chloride, propyl zinc bromide, isopropyl zinc bromide, butyl zinc bromide, sec-butyl zinc bromide and tert-butyl zinc bromide, and dihydrocarbylzine compounds such as dimethylzine, dimethylzine, dibutylzine and diisopropylzine. Examples of organic aluminum compounds include trimethylaluminum, triethylaluminum, triisobutylaluminum, tri-n-hexyl aluminum, diethylaluminum chloride, ethylaluminum sesquidichloride, ethylaluminum dichloride, isobutylaluminum dichloride and methylaluminoxane.

The amount of organometallic compound added is not particularly restricted, but it is preferably 0.1 to 10 mol, more preferably 0.25 to 5.0 mol, even more preferably 0.5 to 2.0 mol and most preferably 0.7 to 1.8 mol, with respect to 1 mol of the modifying agent. This will allow a polymer composition with more excellent storage stability to be obtained.

Such an organometallic compound may be used as the organometallic compound for steps 3, 3', 3" and 1".

(Coupling Agent)

In the method for producing a modified conjugated diene-based polymer of this embodiment, a coupling agent may be added to the polymerization solution between the period after initial polymerization of the monomer until recovery of the polymer, described below. Coupling agents include compounds represented by formula (5) or (6) above.

The amount of coupling agent added is not particularly restricted, but when the polymerization initiator includes an alkali metal, it is preferably 0.03 mol or greater and more preferably 0.05 mol or greater per mole of alkali metal, in order to facilitate kneading of the modified conjugated diene polymer that is produced. The amount of coupling agent added is also preferably no greater than 0.4 mol and more preferably no greater than 0.3 mol per mole of alkali metal, in order to increase the fuel efficiency of the modified conjugated diene polymer composition.

(Production of Modified Conjugated Diene-Based Polymer)

An embodiment of production of the modified conjugated diene-based polymer of the invention will now be described in detail.

One embodiment is the following method comprising steps 1 to 3 (first embodiment).

Step 1: A monomer including a conjugated diene compound is polymerized in the presence of a polymerization initiator, to obtain polymer 1 having active ends.

Step 2: The modifying agent having a functional group capable of reacting with the active ends of polymer 1 is reacted with polymer 1, to obtain polymer 2 having a unit based on the modifying agent introduced at the ends of polymer 1.

Step 3: An organometallic compound is added to polymer 2, reacting the organometallic compound with the unit based on the modifying agent, to obtain a modified conjugated diene-based polymer for the invention.

The form of polymerization in step 1 is not particularly restricted, and it may be carried out as a batch process or a continuous process. The reactor used may be a stirrer-equipped batch reactor or tube reactor. For a continuous process for polymerization, two or more reactors linked together may be used, or a continuous tank reactor may be used.

Step 2 is carried out with the active ends of polymer 1 present.

The modifying agent to be used in step 2 is preferably a compound having the structure represented by formula (5), a compound having the structure represented by formula (6), or a compound having the structure represented by formula (8).

When step 1 is carried out as a batch process, step 2 can be carried out by adding the modifying agent to the reactor in which step 1 has been carried out, or polymer 1 may be transferred to another reactor under conditions in which the active ends of polymer 1 are not eliminated, and the modifying agent and polymer 1 may be contacted in the other reactor. When step 1 is carried out as a continuous process, step 2 may be carried out by adding the modifying agent to the reactor near the end of the polymerization reaction, or if step 1 is carried out in two or more reactors that are linked, step 2 may be carried out by adding the modifying agent to the second or later reactor, in which the polymerization initiator has not been loaded.

When step 1 is carried out as a batch process, step 3 can be carried out by adding the organometallic compound to the reactor in which step 2 has been carried, out, or polymer 2 may be transferred to another reactor, and the organometallic compound and polymer 2 may be contacted in the other reactor. When step 1 is carried out as a continuous process, step 3 may be carried out by adding the organometallic compound to the reactor at a point after step 2, or when step 1 is carried out using two reactors that are linked, step 3 may be carried out by extracting the obtained polymer 2 and guiding it to yet another reactor, and adding the organometallic compound to the other reactor, or when step 1 is carried out using 3 or more reactors that are linked, it may be carried out by adding the organometallic compound to a reactor at a point after step 2.

The second embodiment for production of the modified conjugated diene-based polymer of the invention may be a method comprising the following step 1' and step 3'.

Step 1': A monomer including a conjugated diene compound is polymerized in the presence of a polymerization initiator. The modifying agent having a functional group that is copolymerizable with the conjugated diene compound is polymerized together with it, to obtain polymer 1'.

Step 3': organometallic compound is added to polymer 1', reacting the organometallic compound with the unit based on the modifying agent, to obtain a modified conjugated diene-based polymer for the invention.

The form of polymerization in step 1' is not particularly restricted, and it may be carried out as a batch process or a continuous process. The reactor used may be a stirrer-equipped batch reactor or tube reactor. For a continuous process for polymerization, two or more reactors linked together may be used, or a continuous tank reactor may be used.

The modifying agent used in step 1' is preferably a compound having a structure represented by formula (7).

When step is carried out as a batch process, step 3' can be carried out by adding the organometallic compound to the reactor in which step 1' has been carried out, or polymer 1' may be transferred to another reactor, and the organometallic compound may be added to the other reactor. When step 1' is carried out as a continuous process, step 3' may be carried out by adding the organometallic compound to the reactor near the end of the polymerization reaction, or if step 1' is carried out in two or more reactors that are linked, step 2 may be carried out by adding the organometallic compound to the second or later reactor, in which the modifying agent has not been loaded.

By carrying out the subsequent step 2' after carrying out step and before carrying out step 3', it is possible to obtain, a conjugated diene copolymer (polymer 2') having a unit based on the modifying agent within the molecular chain and at the ends of the polymer.

Step 2': The modifying agent having a functional group capable of reacting with the active ends of polymer 1' is reacted with polymer 1', to obtain polymer 2' having a unit based on the modifying agent introduced at the ends of polymer 1'.

The modifying agent to be used in step 2' is preferably a compound having the structure represented by formula (5), a compound having the structure represented by formula (6), or a compound having the structure represented by formula (8).

By using polymer 2' instead of polymer 1' and carrying out step 3' on polymer 2', it is possible to obtain a modified conjugated diene-based polymer corresponding to polymer 2'. Step 2' may be carried out according to step 2. When step 2' is carried out, step 3' may also be carried out according to step 3.

The third embodiment for production of the modified conjugated diene-based polymer of the invention may be a method comprising the following step 1" and step 3".

Step 1": A monomer including a conjugated diene compound is polymerized in the presence of a polymerization initiator. During this step, the polymerization may be carried out together with a conjugated diene compound and/or aromatic vinyl compound that has a functional group that can be converted to a site capable of reacting with the modifying agent, and that is copolymerizable with a conjugated diene compound, to obtain polymer 1"-1. Next, the functional group of the polymer 1"-1 is converted to a site capable of reacting with the modifying agent, to obtain polymer 1"-2, and polymer 1"-2 is reacted with a modifying agent having a functional group capable of reacting with the converted functional group, to obtain polymer 1".

Step 3: An organometallic compound is added to polymer 1", reacting the organometallic compound with the unit based on the modifying agent, to obtain a modified conjugated diene-based polymer for the invention.

The form of polymerization in step 1" to obtain polymer 1"-1 is not particularly restricted, and it may be carried out as a batch process or a continuous process. The reactor used may be a stirrer-equipped batch reactor or tube reactor. For a continuous process for polymerization, two or more reactors linked together may be used, or a continuous tank reactor may be used.

The conjugated diene compound that has a functional group that can be converted to a modifying agent and that is copolymerizable with a conjugated diene compound, used in step 1", may be a conjugated diene compound, or a conjugated diene compound having a double bond on a side chain. Aromatic vinyl compounds having functional groups that can be converted to modifying agents and are copolymerizable with conjugated diene compounds, to be used in step 1", include vinyltoluenes (2-methylstyrerte, 3-methylstyrene and 4-methylstyrene). Polymer 1"-1 obtained using such a compound may be reacted with the same organometallic compound as used in step 3", and for example, a site capable of reacting with the modifying agent can be added to polymer 1"-1 by drawing off a hydrogen at the allyl position of a double bond of a conjugated diene compound, or drawing off a hydrogen at the benzyl position of the aromatic ring of an aromatic vinyl compound, to obtain polymer 1"-2.

The modifying agent to be reacted with polymer 1"-2 obtained in this manner is preferably a compound having the structure represented by formula (5), a compound having the structure represented by formula (6), or a compound having the structure represented by formula (8).

When polymerization to obtain polymer 1'-1 step 1" is to be carried out by a batch process, the reaction for obtaining polymer 1"-2 and the reaction between polymer 1"-2 and the modifying agent may each be carried out by addition of the organometallic compound or modifying agent to the reactor in which polymerization has been carried out to obtain the polymer 1"-1, or they may each be carried out by transferring polymer 1"-1 or polymer 1"-2 to another reactor, and adding the organometallic compound or modifying agent to the other reactor. When the polymerization to obtain polymer 1"-1 in step 1" is carried out as a continuous process, the reaction for obtaining polymer 1"-2 may be carried out by adding the organometallic compound to the reactor near the end of the polymerization reaction, or when the polymerization to obtain polymer 1"-1 is carried out in two or more reactors that are linked, it may be carried out by adding the organometallic compound to the second or later reactor, in which the monomers have not been loaded. When the polymerization to obtain polymer 1"-1 is carried out as a continuous process in step 1', the reaction between polymer 1"-2 and the modifying agent may be carried out by adding the modifying agent to the reactor at a point after the reaction for obtaining polymer 1"-2, or when the polymerization to obtain polymer 1"-1 in step 1" is carried out using two reactors that are linked, it may be carried out by extracting the obtained polymer 1"-2 and guiding it to yet another reactor, and adding the modifying agent to the other reactor, or it may be carried out by adding the modifying agent to the reactor after having carried out the reaction for obtaining polymer 1"-2.

When the polymerization to obtain polymer 1"-1 in step 1" is carried out as a batch process, step 3" can be carried out by adding the organometallic compound to the reactor in which the reaction to obtain polymer 1" has been carried out, or polymer 1" may be transferred to another reactor, and the organometallic compound may be added to the other reactor. When the polymerization to obtain polymer 1"-1 is carried out as a continuous process in step 1", step 3" may be carried out by adding the organometallic compound to the reactor at a point after the reaction for obtaining polymer 1", or when the polymerization to obtain polymer 1"-1 is carried out using two or more reactors that are linked, it may be carried out by extracting the obtained polymer 1" and guiding it to yet another reactor, and adding the organometallic compound to the other reactor, or it may be carried out by adding the organometallic compound to the reactor after having carried out the reaction for obtaining polymer 1".

By carrying out the subsequent step 2" after carrying out the reaction for obtaining polymer 1"-2 in step 1" and before carrying out step 3", it is possible to obtain a conjugated diene copolymer (polymer 2") having a unit based on the modifying agent within the molecular chain and at the ends of the polymer.

Step 2": The modifying agent having a functional group capable of reacting with the active ends of polymer 1"-2 is reacted with polymer 1"-2, to obtain polymer 2" having a unit based on the modifying agent introduced at the ends of polymer 1"-2.

The modifying agent to be used in step 2" is preferably a compound having the structure represented by formula (5), a compound having the structure represented by formula. (6), or a compound having the structure represented by formula (8).

By using polymer 2" instead of polymer 1" and carrying out step 3" on polymer 2", it is possible to obtain a modified conjugated diene-based polymer corresponding to polymer 2". Step 2" may be carried out according to step 2. When step 2" is carried out, step 3" may also be carried out according to step 3.

The method of recovering the modified conjugated diene-based polymer from the solution dissolving the polymer may be a publicly known method. The recovery method may be, for example, a method of adding a coagulant to a solution containing the modified conjugated diene-based polymer, a method of blowing steam into a solution containing the modified conjugated diene-based polymer and gasifying the volatile components (steam stripping), a method of concentrating it in a flushing tank and causing devolatilization in a vent extruder or the like, or a method of direct devolatilization with a drum dryer or the like. The recovered modified conjugated diene-based polymer may be dried using a publicly known dryer, such as a hand dryer or extrusion dryer. From the viewpoint of processability, since a polymer with a low Mooney viscosity can be easily obtained by applying the present invention, the preferred recovery method is a method of concentrating with a flushing tank and devolatilization with a vent extruder or the like, or a method of direct devolatilization with a drum dryer or the like. Since another feature of the invention is the ability to obtain a copolymer with a low Mooney viscosity and excellent processability, the invention is useful when implementing a steam stripping process.

According to the invention, in order to improve the processability of the modified conjugated diene-based polymer, an extender oil may be mixed with the solution if necessary prior to separating the solvent, recovering the modified conjugated diene polymer as oil-extended rubber.

The Mooney viscosity ($ML_{1+4}$) of the modified conjugated dime-based polymer of this embodiment is preferably 10 or greater and more preferably 20 or greater, for increased tensile break strength. The Mooney viscosity of the modified conjugated diene-based polymer is also preferably no greater than 200 and more preferably no greater than 150, for increased processability. The Mooney viscosity ($ML_{1+4}$) is measured at 100° C., according to HS K6300(1994).

For increased fuel efficiency, the amount of vinyl bonds of the modified conjugated diene-based polymer of this embodiment is preferably no greater than 80 mol % and more preferably no greater than 70 mol %, with the monomer unit content from the conjugated diene compound as 100 mol %. The amount of vinyl bonds in the modified conjugated diene-based polymer is also preferably 10 mol % or greater, more preferably 15 mol % or greater, even more preferably 20 mol % or greater and most preferably 30 mol % or greater, with the monomer unit content from the conjugated diene compound as 100 mol %, for an increased grip property. The amount of vinyl bonds may be determined by infrared spectroscopic analysis, based on the absorption intensity near 910 $cm^{-1}$ which is the absorption peak for vinyl groups.

The modified conjugated diene-based polymer of this embodiment has a structure produced by reaction of the organometallic compound with the unit based on the modifying agent. When the conjugated diene-based polymer has a unit derived from a modifying agent having a structure represented by formula (6) above, the modified conjugated diene-based polymer may have a structure represented by the following formula (A1), (A2) or (A3). The modified conjugated diene-based polymer may also be a mixture of a polymer having a structure represented by the following formula (A1), a polymer having a structure represented by the following formula (A2) and a polymer having a structure represented by the following formula (A3), for example.

[Chemical Formula 22]

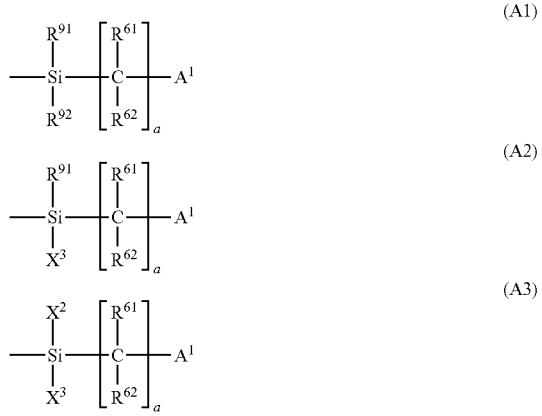

In formulas (A1), (A2) and (A3), $X^2$, $X^3$, $R^{61}$, $R^{62}$, a and $A^1$ have the same definitions as in formula (6), and $R^{91}$ and $R^{92}$ each independently represent a hydrocarbyl group of 1 to 20 carbon atoms. $R^{91}$ and $R^{92}$ are preferably hydrocarbyl groups of 1 to 10 carbon atoms.

The modified conjugated diene-based polymer of this embodiment may also be a polymer having a structure represented by the following formula (B), for example.

[Chemical Formula 23]

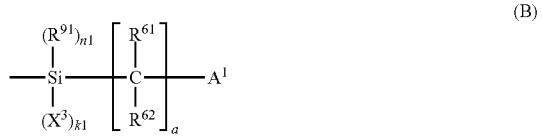

In formula (B), $X^3$, $R^{61}$, $R^{62}$, a and $A^1$ have the same definitions as in formula (6), $R^{91}$ represents a hydrocarbyl group of 1 to 20 carbon atoms, and n1 and k1 each independently represent a real number such that n1+k1=2 is satisfied. $R^{91}$ is preferably a hydrocarbyl group of 1 to 10 carbon atoms.

The modified conjugated diene-based polymer of this embodiment may also be a polymer having a structure obtained by reacting an organometallic compound with a conjugated diene-based copolymer that has been modified with a compound represented by formula (7).

[Method for Producing Polymer Composition]

A reinforcing material may be combined with the modified conjugated diene-based polymer of this embodiment to prepare a polymer composition. The method for producing a polymer composition of this embodiment comprises a step of kneading 10 to 150 parts by mass of a reinforcing material with respect to 100 parts by mass of the modified conjugated diene-based copolymer.

The reinforcing material may be silica, calcium silicate, aluminum silicate or carbon black, for example. Two or more different types of these may also be used in combination.

Silicas include dry silica (silicic anhydride), wet silica (hydrous slick acid), colloidal silica and precipitated silica. The BET specific surface area of the silica is preferably 50 m$^2$/g to 250 m$^2$/g. The BET specific surface area is measured according to ASTM D1993-03. Commercial products that may be used include "ULTRASIL VN3-G", trade name of Degussa, "VN3", "AQ", "ER" and "RS-150", trade names of Tosoh Silica Corp., and "Zeosil 1115 MP" and "Zeosil 1165 MP", trade names of Rhodia.

Carbon blacks include furnace black, acetylene black, thermal black, channel black: and graphite. Examples of carbon blacks include channel carbon black such as EPC, MPC and CC; furnace carbon black such as SAF, ISAF, HAF, MAF, FEF, SRF, GPF, APF, FF, CF, SCF and ECF; thermal carbon black such as FT and MT, and acetylene carbon black.

The nitrogen adsorption specific surface area (NSA) of the carbon black is preferably 5 m$^2$/g to 200 m$^2$/g, and the dibutyl phthalate (DBP) absorption of the carbon black is preferably 5 mL/100 g to 300 mL/100 g. The nitrogen adsorption specific surface area is measured according to ASTM D4820-93, and the DBP absorption is measured according to ASTM D2414-93. Commercial products that may be used include "DIABLACK N339", trade name of Mitsubishi Chemical Corp., "SEAST 6", "SEAST 7HM" and "SEAST KH", trade names of Tokai Carbon Co., Ltd., and "CK 3" and "Special Black 4A", trade names of Degussa.

The content of the reinforcing material in the polymer composition is 10 parts by mass or greater, preferably 20 parts by mass or greater and more preferably 30 parts by mass or greater with respect to 100 parts by mass of the modified conjugated diene-based polymer, for increased wear resistance and strength. The content of the reinforcing material is also no greater than 150 parts by mass, preferably no greater than 120 parts by mass and more preferably no greater than 100 parts by mass, for an increased reinforcing property.

Other polymer components and additives may also be combined with the modified conjugated diene-based polymer of this embodiment to prepare a polymer composition.

Examples of other polymer components include styrene-butadiene copolymer rubber, poly butadiene rubber, butadiene-isoprene copolymer rubber and butyl rubber. Natural rubber, ethylene-propylene copolymer and ethylene-octene copolymer may also be mentioned. Two or more of such other polymer components may also be used in combination.

When another polymer component is to be added, the content of the modified conjugated diene-based polymer of this embodiment in the polymer composition is preferably 10 mass % or greater and more preferably 20 mass % or greater with respect to 100 mass % as the total amount of the polymer component in the polymer composition (including the modified conjugated diene-based polymer), for increased fuel efficiency.

Publicly known additives may be used as such additives, examples thereof including vulcanizing agents such as sulfur; vulcanization accelerators such as thiazole-based vulcanization accelerators, thiuram-based vulcanization accelerators, sulfenamide-based vulcanization accelerators and guanidine-based vulcanization accelerators; vulcanizing activators such as stearic acid and zinc oxide; organic peroxides such as dicumyl peroxide and di-tertiary butyl peroxide; fillers such as calcium carbonate, talc, alumina, clay, aluminum hydroxide and mica; silane coupling agents; extender oils; processing aids; age inhibitors; and lubricants.

The sulfur may be powdered sulfur, precipitated sulfur, colloidal sulfur, insoluble sulfur or highly dispersed sulfur. The sulfur content is preferably 0.1 to 15 parts by mass, more preferably 0.3 to 10 parts by mass and even more preferably 0.5 to 5 parts by mass with respect to 100 parts by mass of the polymer component.

Vulcanization accelerators include thiazole-based vulcanization accelerators such as 2-mercaptobenzothiazole, dibenzothiazyldisulfide and N-cyclohexyl-2-benzothiazyl sulfenamide; thiuram-based vulcanization accelerators such as tetramethylthiuram monosulfide and tetramethylthiuram disulfide; sulfenamide-based vulcanization accelerators such as N-cyclohexyl-2-benzothiazole sulfenamide, N-tert-butyl-2-benzothiazole sulfenamide, N-oxymethylene-2-benzothiazole sulfenamide, N-oxyethylene-2-benzothiazole sulfenamide and N,N'-diisopropyl-2-benzothiazole sulfenamide; and guanidine-based vulcanization accelerators such as diphenylguanidine, diortho-tolylguanidine and ortho-tolylbiguanidine. The vulcanization accelerator content is preferably 0.1 to 5 parts by mass and more preferably 0.2 to 3 parts by mass with respect to 100 parts by mass of the polymer component.

Examples of silane coupling agents include vinyltrichlorosilane, vinyltriethoxysilane, vinyltris(β-methoxyethoxy)silane, β-(3,4-epoxycyclohexyl)ethyltrimethoxysilane, γ-glycidoxypropyltrimethoxysilane, γ-methacryloxypropyltrimethoxysilane, N-(β-aminoethyl)-γ-aminopropyltrimethoxysilane, N-(β-aminoethyl)-γ-aminopropylmethyldimethoxysilane, N-phenyl-γ-aminopropyltrimethoxysilane, γ-chloropropyltrimethoxysilane, γ-mercaptopropyltrimethoxysilane, γ-aminopropyltriethoxysilane, bis(3-(triethoxysilyl)propyl)disulfide, bis(3-(triethoxysilyl)propyl)tetrasulfide, γ-trimethoxysilylpropyldimethylthiocarbate tetrasulfide, γ-trimethoxysilylpropylbenzothiazyl tetrasulfide, 3-octanoylthio-1-propyltriethoxysilane and mercaptothiocarboxylate oligomer. One or more types of these may be used. Commercial products that may be used include "Si69", "Si75" and "Si266" trade names of Evonik Co., and "NXT Silane", "NXT-Z30", "NXT-Z45", "NXT-Z60" and "NXT-Z100", trade names of Momentive Performance Materials.

The silane coupling agent content is preferably 1 to 20 parts by mass, more preferably 2 to 15 parts by mass and even more preferably 5 to 10 parts by mass with respect to 100 parts by mass of the reinforcing material.

Examples of extender oils include aromatic-based mineral oils (viscosity gravity constant (V.G.C.) value: 0.900 to 1.049), naphthene-based mineral oils (V.G.C. value: 0.850 to 0.899) and paraffinic mineral oils (V.G.C. value: 0.790 to 0.849). The polycyclic aromatic content of the extender oil is preferably less than 3 mass % and more preferably less than 1 mass %. The polycyclic aromatic content is measured according to British Petroleum Institute method 346/92. The aromatic compound content (CA) of extender oil is preferably 20 mass % or greater. One or more of such extender oils may be used.

The method for producing the polymer composition of this embodiment may employ a method of kneading the components with a publicly known mixer, such as a roll or Banbury mixer, for example.

As the kneading conditions when additives other than a vulcanizing agent and vulcanization accelerator are to be added, the kneading temperature will usually be 50 to 200° C. and preferably 80 to 190° C., and the kneading time will usually be 30 seconds to 30 minutes and preferably 1 minute to 30 minutes. When a vulcanizing agent and vulcanization accelerator are to be added, the kneading temperature will usually be no higher than 100° C. and preferably room temperature to 80° C. The composition in which a vulcanizing agent and vulcanization accelerator have been added is usually used after vulcanizing treatment by press vulcanization or the like. The curing temperature will usually be 120 to 200° C., and is preferably 140 to 180° C.

The polymer composition of this embodiment has excellent storage stability as well as excellent fuel efficiency, and can be suitably used in tires.

EXAMPLES

The present invention will now be explained in greater detail through the following examples, with the understanding that these examples are in no way limitative on the invention.

The following methods were used to evaluate the physical properties.
1. Mooney Viscosity ($ML_{1+4}$)

The initial Mooney viscosity of the polymer was measured at 100° C., according to JIS K6300(1994). Next, the polymer was allowed to stand in a thermostatic bath at a temperature of 50° C., and the Mooney viscosity was measured after 2 weeks (accelerated test)
2. Vinyl Bonds (Units: Mol %)

The amount of vinyl bonds in the polymer was determined by infrared spectroscopic analysis, based on the absorption intensity near 910 $cm^{-1}$ which is the absorption peak for vinyl groups.
3. Content of Monomer Units Derived from Styrene (Units: Mass %)

The content of monomer units derived from styrene in the polymer was determined from the refractive index, according to JIS K6383(1995).
4. Molecular Weight Distribution (Mw/Mn)

The weight-average molecular weight (Mw) and number-average molecular weight (Mn) were measured by gel permeation chromatography (GPC) under the following conditions (1) to (8), and the molecular weight distribution (Mw/Mn) of the polymer was calculated.
(1) Apparatus: HLC-8220, Tosoh Corp.
(2) Separating column: TSKgel SuperHM-H (two in series), Tosoh Corp.
(3) Measuring temperature: 40° C.
(4) Carrier: Tetrahydrofuran
(5) Flow rate: 0.6 mL/min
(6) injection rate: 5 µL
(7) Detector: Differential refractometer
(8) Molecular weight reference: Standard polystyrene
5. Fuel Efficiency A 1 mm- or 2 mm-wide, 40 mm-long test strip punched from a sheet-like vulcanized compact was provided for testing. The loss tangent of the test strip at a temperature of 70° C. (tan δ(70° C.)) was measured with a viscoelasticity meter (product of Ueshima Seisakusho Co., Ltd.), under conditions with a strain of 1%, and a frequency of 10 Hz. For comparison of fuel efficiency performance, since large differences in microstructure result in major differences in fuel efficiency performance due to differing mobility, comparison is preferably made between polymers with similar microstructure.

Example 1

<Production of Modified Conjugated Diene-Based Polymer>
(Step 1)

A stirrer-mounted stainless steel polymerization reactor with an internal volume of 20 L was washed and dried, and the atmosphere in the interior of the polymerization reactor was exchanged with dry nitrogen. Next, 10.2 kg of industrial hexane (Sumitomo Chemical Co., Ltd., trade name: Hexane (common name), density: 0.68 g/mL) 720 g of 1,3-butadiene, 80 g of styrene, 6.1 mL of tetrahydrofuran and 1.1 mL of ethyleneglycol diethyl ether were loaded into the polymerization reactor. For preliminary detoxification of the impurities with the potential to inactivate the polymerization initiator, a hexane solution containing a small amount of n-butyllithium (n-BuLi) was loaded into the polymerization reactor as a scavenger after which an n-hexane solution containing 13.42 mmol n-BuLi was loaded into the polymerization reactor, and then polymerization reaction was initiated.

Polymerization reaction was conducted for 3 hours. During the polymerization reaction, the temperature in the polymerization reactor was adjusted to 65° C., the solution in the polymerization reactor was stirred at a stirring speed of 130 rpm, and 1080 g of 1,3-butadiene and 120 g of styrene were continuously supplied into the polymerization reactor. Next, while maintaining a polymerization reactor temperature of 65° C., the obtained polymerization solution was stirred in the polymerization reactor at a stirring speed of 130 rpm, 1.13 mmol of silicon tetrachloride was added to the polymerization solution, and stirring was continued for 15 minutes.

(Step 2)

After step 1, while maintaining a polymerization reactor temperature of 65° C., the obtained polymerization solution was stirred in the polymerization reactor at a stirring speed of 130 rpm, 8.90 mmol of [3-(diethylamino)propyl] trimethoxysilane was added as a modifying agent to the polymerization solution, and stirring was continued for 15 minutes.

(Step 3)

After step 2, while maintaining a polymerization reactor temperature of 65° C., the obtained polymerization solution was stirred in the polymerization reactor at a stirring speed of 130 rpm, an n-hexane solution containing 8.90 mmol of n-BuLi was added, and stirring was continued for 15 minutes. After loading 5 ml of a hexane solution containing 0.8 mL of methanol into the polymerization reactor, the polymer solution was stirred for 5 minutes.

After then loading 8.0 g of 2-tert-butyl-6-(3-tert-butyl-2-hydroxy-5-methylbenzyl)-4-methylphenyl acrylate (product of Sumitomo Chemical Co., Ltd., trade name: SUMMER GM) and 4.0 g of pentaerythtityltetrakis (3-lauryl thiopropionate) (product of Sumitomo Chemical Co., Ltd., trade name: SUMIRIZER TP-D) into the polymerization reactor, most of the volatile components in the polymer solution were vaporized off at ordinary temperature for 24 hours, and then reduced pressure drying was carried out at 55° C. for 12 hours to obtain modified conjugated diene-based polymer 1.

<Preparation of Polymer Composition>

In a Laboplastomil there were kneaded 100 parts by mass of modified conjugated diene-based polymer 1, 80.0 parts by mass of silica (product of Degussa, trade name: ULTRASIL VN3-G), 6.4 parts by mass of a silane coupling agent (product of Degussa, trade name: Si69), 5.0 parts by mass of carbon black (product of Mitsubishi Chemical Corp., trade name: DIABLACK N339), 40.0 parts by mass of an extender oil (product of Japan Energy Corp., trade name: JOMO process NC-140), 2.0 parts by mass of an age inhibitor (product of Sumitomo Chemical Co., Ltd., trade name: ANTIGEN 6C), 1.5 parts by mass of wax (product of Ouchi Shinko Chemical Industrial Co., Ltd., trade name: SUNNOC N), 1 part by mass of wax (product of Struktol, trade name: EF44), 2.0 parts by mass of stearic acid and 2.0 parts by mass of zinc oxide, to prepare a polymer composition.

<Fabrication of Vulcanized Sheet=

To the obtained polymer composition there were added 1.5 parts by mass of a vulcanization accelerator (product of Sumitomo Chemical Co., Ltd., trade name: SOXINOL CZ), 2.0 parts by mass of another vulcanization accelerator (product of Sumitomo Chemical Co., Ltd., trade name: SOXINOL D) and 1.5 parts by mass of sulfur, and the mixture was molded into a sheet using a 6-inch roll and heated at 160° C. for 55 minutes for vulcanization, to fabricate a vulcanized sheet.

Example 2

Modified conjugated diene-based polymer 2 was obtained in the same manner as Example 1, except that in step 3, the n-hexane solution containing 8.90 mmol of n-BuLi was changed to an n-hexane solution containing 17.80 mmol of n-BuLi. Except for using this polymer, the procedure was carried out in the same manner as Example 1 to prepare a polymer composition and produce a vulcanized sheet.

Comparative Example 1

Modified conjugated diene-based polymer C1 was obtained in the same manner as Example 1, except that no n-BuLi-containing n-hexane solution was added in step 3. Except for using this polymer, the procedure was carried out in the same manner as Example 1 to prepare a polymer composition and produce a vulcanized sheet.

The vinyl bond amounts, styrene unit contents, molar ratios of n-BuLi used in step 3 with respect to the modifying agent used in step 2, Mooney viscosities, and vulcanized sheet fuel efficiency evaluation results for the modified conjugated diene-based polymers obtained in Examples 1 and 2 and Comparative Example 1 are shown in Table 1. Smaller differences between the initial Mooney viscosity and that after the accelerated test shown in Table 1 indicate superior storage stability, and the fuel efficiencies are relative values with respect to 100 for Comparative Example 1, with larger numerical values indicating superior fuel efficiency.

TABLE 1

|  |  | Example 1 | Example 2 | Comp. Ex. 1 |
|---|---|---|---|---|
| Vinyl bonds (mol %) | | 38 | 38 | 39 |
| Styrene unit content (mass %) | | 10 | 10 | 11 |
| nBuLi/modifying agent (molar ratio) | | 1 | 2 | 0 |
| Mooney viscosity | Initial | 63 | 62 | 60 |
|  | After accelerated test | 73 | 61 | 120 |
| Fuel efficiency tanδ(70° C.) | | 101 | 100 | 100 |

Example 3

<Production of Modified Conjugated Diene-Based Polymer>

(Step 1)

A stirrer-mounted stainless steel polymerization reactor with an internal volume of 20 L was washed and dried, and the atmosphere in the interior of the polymerization reactor was exchanged with dry nitrogen. Next, 10.2 kg of "Hexane (common name)", 608 g of 1,3-butadiene, 192 g of styrene, 6.1 mL of tetrahydrofuran and 4.6 mL of ethyleneglycol diethyl ether were loaded into the polymerization reactor. After then loading a small amount of an n-BuLi hexane solution into the polymerization reactor, an n-hexane solution containing 15.20 mmol of n-BuLi was loaded into the polymerization reactor and polymerization reaction was initiated.

Polymerization reaction was conducted for 3 hours. During the polymerization reaction, the temperature in the polymerization, reactor was adjusted to 65° C., the solution in the polymerization reactor was stirred at a stirring speed of 130 rpm, and 912 g of 1,3-butadiene and 288 g of styrene were continuously supplied into the polymerization reactor. Next, while maintaining a polymerization reactor temperature of 65° C., the obtained polymerization solution was stirred in the polymerization reactor at a stirring speed of 130 rpm, 1.16 mmol of silicon tetrachloride was added to the polymerization solution, and stirring was continued for 15 minutes.

(Step 2)

After step 1, while maintaining a polymerization reactor temperature of 65° C., the obtained polymerization solution was stirred in the polymerization reactor at a stirring speed of 130 rpm, 10.55 mmol of [3-(diethylamino)propyl] trimethoxysilane was added to the polymerization solution, and stirring was continued for 15 minutes.

(Step 3)

After step 2, while maintaining a polymerization reactor temperature of 65° C., the obtained polymerization solution was stirred in the polymerization reactor at a stirring speed of 130 rpm, an n-hexane solution containing 10.55 mmol of n-BuLi was added, and stirring was continued for 15 minutes. After loading 5 ml of a hexane solution containing 0.8 mL of methanol into the polymerization reactor, the polymer solution was stirred fix 5 minutes.

Next, 8.0 g of "SUMIRIZER GM" and 4.0 g of "SIMMER TP-D" were loaded into the polymerization reactor, after which most of the volatile components in the polymer solution were vaporized off at ordinary temperature for 24 hours, and reduced pressure drying was carried out at 55° C. for 12 hours to obtain modified conjugated diene-based polymer 3.

<Preparation of Polymer Composition and Fabrication of Vulcanized Sheet>

Except for using modified conjugated diene-based polymer 3, the procedure was carried out in the same manner as Example 1 to prepare a polymer composition and produce a vulcanized sheet.

Example 4

Modified conjugated diene-based polymer 4 was obtained in the same manner as Example 3, except that in step 3, the n-hexane solution containing 1055 mmol of n-BuLi was changed to an n-hexane solution containing 15.83 mmol of n-BuLi. Except for using this polymer, the procedure was carried out in the same manner as Example 3 to prepare a polymer composition and produce a vulcanized sheet.

Example 5

Modified conjugated diene-based polymer 5 was obtained in the same manner as Example 3, except that an n-hexane solution containing 21.10 mmol of n-BuLi was added in step 3. Except for using this polymer, the procedure was carried out in the same manner as Example 3 to prepare a polymer composition and produce a vulcanized sheet.

Comparative Example 2

Modified conjugated diene-based copolymer C2 was in the same manner as Example 3, except that no n-BuLi-containing n-hexane solution was added in step 3. Except for using this polymer, the procedure was carried out in the same manner as Example 3 to prepare a polymer composition and produce a vulcanized sheet.

The vinyl bond amounts, styrene unit contents, molar ratios of n-BuLi used in step 3 with respect to the modifying agent used in step 2, Mooney viscosities, and vulcanized sheet fuel efficiency evaluation results for the modified conjugated diene-based polymers obtained in Examples 3 to 5 and Comparative Example 2 are shown in Table 2. The fuel efficiencies in Table 2 are relative values, with Comparative Example 2 as 100.

TABLE 2

|  |  | Example 3 | Example 4 | Example 5 | Comp. Ex. 2 |
|---|---|---|---|---|---|
| Vinyl bonds (mol %) | | 57 | 57 | 58 | 57 |
| Styrene unit content (mass %) | | 24 | 25 | 25 | 25 |
| nBuLi/modifying agent (molar ratio) | | 1 | 1.5 | 2 | 0 |
| Mooney | Initial | 48 | 46 | 45 | 53 |
| viscosity | After accelerated test | 54 | 45 | 42 | 76 |
| Feel efficiency tanδ (70° C.) | | 108 | 125 | 95 | 100 |

Example 6

<Production of Modified Conjugated Diene-Based Polymer>

(Step 1')

A stirrer-mounted stainless steel polymerization reactor with an internal volume of 20 L was washed and dried, and the atmosphere in the interior of the polymerization reactor was exchanged with dry nitrogen. Next, 10.2 kg of "Hexane (common name)", 608 g of 1,3-butadiene, 192 g of styrene, 6.1 mL of tetrahydrofuran, 4.6 mL, of ethyleneglycol diethyl ether and 3.66 mmol of bis(diethylamino)methylvinylsilane were loaded into the polymerization reactor. After then loading a small amount of an n-BuLi hexane solution into the polymerization reactor, an n-hexane solution containing 11.70 mmol of n-BuLi was loaded into the polymerization reactor and polymerization reaction was initiated.

After conducting polymerization reaction for 0.5 hour, 4.88 mmol of bis(diethylamino)methylvinylsilane was loaded into the polymerization reactor, and polymerization reaction was continued for 2.5 hours. During the total of 3 hours of polymerization reaction, the temperature in the polymerization reactor was adjusted to 65° C., the solution in the polymerization reactor was stirred at a stirring speed of 130 rpm, and 912 g of 1,3-butadiene and 288 g of styrene were continuously supplied into the polymerization reactor.

(Step 3')

After step 1', while maintaining a polymerization reactor temperature of 65° C., the obtained polymerization solution was stirred in the polymerization reactor at a stirring speed of 130 rpm, an n-hexane solution containing 17.08 mmol of n-BuLi was added, and stirring was continued for 15 minutes. After loading 5 ml of a hexane solution containing 0.8 mL of methanol into the polymerization reactor, the polymer solution was stirred for 5 minutes.

Next, 8.0 g of "SUMIRTZER GM" and 4.0 g of "SUMIRIZER TP-D" were loaded into the polymerization reactor, after which most of the volatile components in the polymer solution were vaporized off at ordinary temperature for 24 hours, and reduced pressure drying was carried out at 55° C. for 12 hours to obtain modified conjugated diene-based polymer 6.

<Preparation of Polymer Composition and Fabrication of Vulcanized Sheet

Except for using modified conjugated diene-based polymer 6, the procedure was carried out in the same manner as Example 1 to prepare a polymer composition and produce a vulcanized sheet.

Example 7

Modified conjugated diene-based polymer 7 was obtained in the same manner as Example 6, except that in step 3', the n-hexane solution containing 17.08 mmol of n-BuLi was changed to an n-hexane solution containing 34.16 mmol of n-BuLi. Except for using this polymer, the procedure was carried out in the same manner as Example 6 to prepare a polymer composition and produce a vulcanized sheet.

Comparative Example 3

Modified conjugated diene-based polymer C3 was obtained in the same manner as Example 6, except that no n-BuLi-containing n-hexane solution was added in step 3'. Except for using this polymer, the procedure was carried out in the same manner as Example 6 to prepare a polymer composition and produce a vulcanized sheet.

The vinyl bond amounts, styrene unit contents, molar ratios of n-BuLi used in step 3' with respect to the modifying agent used in step 1', Mooney viscosities, and vulcanized sheet fuel efficiency evaluation results for the modified conjugated diene-based polymers obtained in Examples 6 and 7 and Comparative Example 3 are shown in Table 3. The fuel efficiencies in Table 3 are relative values, with Comparative Example 3 as 100.

TABLE 3

| | | Example 6 | Example 7 | Comp. Ex. 3 |
|---|---|---|---|---|
| Vinyl bonds (mol %) | | 57 | 57 | 58 |
| Styrene unit content (mass %) | | 25 | 24 | 25 |
| nBuLi/modifying agent (molar ratio) | | 2 | 4 | 0 |

TABLE 3-continued

| | | Example 6 | Example 7 | Comp. Ex. 3 |
|---|---|---|---|---|
| Mooney viscosity | Initial | 41 | 48 | 43 |
| | After accelerated test | 44 | 51 | 57 |
| Fuel efficiency tanδ | | 97 | 101 | 100 |

Example 8

<Production of Modified Conjugated Diene-Based Polymer>

(Step 1')

Step 1' was carried out same manner as Example 6.

(Step 2')

After step 1', while maintaining a polymerization reactor temperature of 65° C., the obtained polymerization solution was stirred in the polymerization reactor at a stirring speed of 130 rpm, 11.70 mmol of N-(3-dimethylaminopropyeacrylamide was added to the polymerization solution, and stirring was continued for 15 minutes.

(Step 3')

After step 2', while maintaining a polymerization reactor temperature of 65° C., the obtained polymerization solution was stirred in the polymerization reactor at a stirring speed of 130 rpm, an n-hexane solution containing 17.08 mmol of n-BuLi was added, and stirring was continued for 15 minutes. After loading 5 ml of a hexane solution containing 0.8 mL of methanol into the polymerization reactor, the polymer solution was stirred for 5 minutes.

Next, 8.0 g of "SUMIRIZER. GM" and 4.0 g of "SUMIRIZER TP-D" were loaded into the polymerization reactor, after which most of the volatile components in the polymer solution were vaporized off at ordinary temperature for 24 hours, and reduced pressure drying was carried out at 55° C. for 12 hours to obtain modified conjugated diene-based polymer 8.

<Preparation of Polymer Composition and Fabrication of Vulcanized Sheet>

Except for using modified conjugated diene-based polymer 8, the procedure was carried out in the same manner as Example 1 to prepare a polymer composition and produce a vulcanized sheet.

Example 9

Modified conjugated diene-based polymer 9 was obtained in the same manner as Example 8, except that in step 3', the n-hexane solution containing 17.08 mmol of n-BuLi was changed to an n-hexane solution containing 40.48 mmol of n-BuLi. Except for using this polymer, the procedure was carried out in the same manner as Example 8 to prepare a polymer composition and produce a vulcanized sheet.

Comparative Example 4

Modified conjugated diene-based copolymer C4 was obtained in the same manner as Example 8, except that no n-BuLi-containing n-hexane solution was added in step 3'. Except for using this polymer, the procedure was carried out in the same manner as Example 8 to prepare a polymer composition and produce a vulcanized sheet.

The vinyl bond amounts, styrene unit contents, molar ratios of n-BuLi used in step 3' with respect to the modifying agent used in step 1', Mooney viscosities, and vulcanized sheet fuel efficiency evaluation results for the modified conjugated diene-based polymers obtained in Examples 8 and 9 and Comparative Example 4 are shown in Table 4. The fuel efficiencies in Table 4 are relative values, with Comparative Example 4 as 100.

TABLE 4

|  | Example 8 | Example 9 | Comp. Ex. 4 |
| --- | --- | --- | --- |
| Vinyl bonds (mol %) | 56 | 56 | 56 |
| Styrene unit content (mass %) | 24 | 25 | 25 |
| nBuLi/modifying agent (molar ratio) | 2 | 4.7 | 0 |
| Mooney viscosity    Initial | 49 | 50 | 52 |
| Mooney viscosity    After accelerated test | 50 | 50 | 66 |
| Fuel efficiency tanδ | 97 | 101 | 100 |

Example 10

<Production of Modified Conjugated Diene-Based Polymer>
(Step 1)

A stirrer-mounted stainless steel polymerization reactor with an internal volume of 20 L was washed and dried, and the atmosphere in the interior of the polymerization reactor was exchanged with dry nitrogen. Next, 10.2 kg of "Hexane (common name)", 608 g of 1,3-butadiene, 192 g of styrene, 6.1 mL of tetrahydrofuran and 4.6 mL of ethyleneglycol diethyl ether were loaded into the polymerization reactor. After then loading a small amount of an n-BuLi hexane solution into the polymerization reactor, an n-hexane solution containing 15.20 mmol of n-BuLi was loaded into the polymerization reactor and polymerization reaction was initiated.

Polymerization reaction was conducted for 3 hours. During the polymerization reaction, the temperature in the polymerization reactor was adjusted to 65° C., the solution in the polymerization reactor was stirred at a stirring speed of 130 rpm, and 912 g of 1,3-butadiene and 288 g of styrene were continuously supplied into the polymerization reactor. Next, while maintaining a polymerization reactor temperature of 65° C., the obtained polymerization solution was stirred in the polymerization reactor at a stirring speed of 130 rpm, 1.16 mmol of silicon tetrachloride was added to the polymerization solution, and stirring was continued for 15 minutes.

(Step 2)

After step 1, while maintaining a polymerization reactor temperature of 65° C., the obtained polymerization solution was stirred in the polymerization reactor at a stirring speed of 130 rpm, 10.55 mmol of [3-(diethylamino)propyl]trimethoxysilane was added to the polymerization solution, and stirring was continued for 15 minutes.

(Step 3)

After step 2, while maintaining a polymerization reactor temperature of 65° C., the obtained polymerization solution was stirred in the polymerization reactor at a stirring speed of 130 rpm, an n-hexane solution containing 15.83 mmol of n-BuLi was added, and stirring was continued for 15 minutes. After loading 5 ml of a hexane solution containing 0.8 mL of methanol into the polymerization reactor, the polymer solution was stirred for 5 minutes.

Next, 8.0 g of "SUMIRIZER GM" and 4.0 g of "SUMIRIZER TP-D" were loaded into the polymerization reactor to obtain a polymer solution. When a portion of the polymer solution was vaporized off at ordinary temperature for 24 hours and reduced pressure drying was conducted at 55° C. for 12 hours, the ML viscosity was 41. The polymer solution was then desolvated by steam stripping, and then dried for 24 hours with a hot air drier at 70° C. to obtain modified conjugated diene-based polymer 10. The ML viscosity of the modified conjugated diene-based polymer 10 was 44.

<Preparation of Polymer Composition and Fabrication of Vulcanized Sheet>

Except for using modified conjugated diene-based polymer 10, the procedure was carried out in the same manner as Example 1 to prepare a polymer composition and produce a vulcanized sheet.

Comparative Example 5

A polymer solution was obtained in the same manner as Example 10, except that no n-BuLi-containing n-hexane solution was added in step 3. When a portion of the polymer solution was vaporized off at ordinary temperature for 24 hours and reduced pressure drying was conducted at 55° C. for 12 hours, the ML viscosity was 46. The polymer solution was then desolvated and dried in the same manner as Example 10 to obtain modified conjugated diene-based polymer C5. The ML viscosity of the modified conjugated diene-based polymer C5 was 63. Except for using this polymer, the procedure was carried out in the same manner as Example 10 to prepare a polymer composition and produce a vulcanized sheet.

The vinyl bond amounts, styrene unit contents, molar ratios of n-BuLi used in step 3 with respect to the modifying agent used in step 2, Mooney viscosities, and vulcanized sheet fuel efficiency evaluation results for the modified-conjugated diene-based polymers obtained in Example 10 and Comparative Example 5 are shown in Table 5. The fuel efficiencies in Table 5 are relative values, with Comparative Example 5 as 100. Also, the Mooney viscosities are the values with reduced pressure drying and the values after steam stripping and hot air drying, with a smaller difference representing superior storage stability.

TABLE 5

|  | Example 10 | Comp. Ex. 5 |
| --- | --- | --- |
| Vinyl bonds (mol %) | 56 | 56 |
| Styrene unit content (mass %) | 24 | 25 |
| nBuLi/modifying agent (molar ratio) | 1.5 | 0 |
| Mooney viscosity    Reduced pressure drying | 41 | 46 |
| Mooney viscosity    Steam stripping | 44 | 63 |
| Fuel efficiency tanδ | 100 | 100 |

The invention claimed is:

1. A method for producing a modified conjugated diene-based polymer, comprising a step of allowing an organometallic compound to react with a conjugated diene-based polymer having a unit based on a conjugated diene compound-containing monomer, and a unit based on a modifying agent that has a silicon atom, tin atom, germanium atom or phosphorus atom,
   wherein the organometallic compound is at least one selected from the group consisting of an organic alkali metal compound and an organic alkaline earth metal compound.

2. The method according to claim 1, wherein the conjugated diene-based polymer has the unit based on the modifying agent at the ends.

3. The method according to claim 1, wherein the conjugated diene-based polymer has the unit based on the modifying agent within the molecular chain.

4. The method according to claim 1, wherein the modifying agent includes a compound having a structure represented by formula (5):

(5)

wherein $R^1$ represents an alkyl, alkenyl, cycloalkenyl or aryl group, $M^1$ represents a silicon atom, tin atom, germanium atom or phosphorus atom, $L^1$ represents a halogen atom or a hydrocarbyloxy group, and when multiple $R^1$ and $L^1$ groups are present they may be the same or different, when $M^1$ is a silicon atom, tin atom or germanium atom, n represents 0 and m and l are each independently an integer of 0 to 4 such that m+l=4 is satisfied, and when $M^1$ is a phosphorus atom, n represents 0 or 1 and in and l are each independently an integer of 0 to 3 such that m l=3 is satisfied.

5. The method according to claim 1, wherein the modifying agent includes a compound having a structure represented by formula (6):

(6)

wherein $X^1$, $X^2$ and $X^3$ each independently represent a hydrocarbyl group, a hydrocarbyloxy group, a halogen atom or a functional group capable of reacting with the active ends of the conjugated diene-based polymer, $R^{61}$ and $R^{62}$ each independently represent a hydrogen atom or a hydrocarbyl group, and when multiple $R^{61}$ and $R^{62}$ groups are present they may be the same or different, $A^1$ represents an organic group having at least one atom selected from the group consisting of oxygen atoms, nitrogen atoms, phosphorus atoms, sulfur atoms and silicon atoms, optionally having a ring structure, with a portion of the structure of $X^1$, $X^2$ or $X^3$ optionally bonded to a portion of $A^1$, and "a" represents an integer of 0 to 10.

6. The method according to claim 1, wherein the modifying agent includes a compound having a structure represented by formula (7):

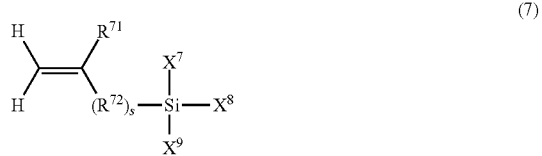
(7)

wherein $R^{71}$ represents a hydrogen atom or a hydrocarbyl group, s represents 0 or 1, $R^{72}$ represents a hydrocarbylene group, $X^7$, $X^8$ and $X^9$ each independently represent a substituted amino group, or an optionally substituted hydrocarbyl group, with at least one of $X^7$, $X^8$ and $X^9$ being a substituted amino group.

7. A method for producing a polymer composition, comprising a step of kneading 10 to 150 parts by mass of a reinforcing material with respect to 100 parts by mass of a modified conjugated diene-based copolymer produced by the method according to claim 1.

* * * * *